United States Patent
Endo et al.

(10) Patent No.: US 9,958,026 B2
(45) Date of Patent: May 1, 2018

(54) DAMPING STRUCTURE

(71) Applicant: CANON KABUSHIKI KAISHA, Tokyo (JP)

(72) Inventors: Rie Endo, Yokohama (JP); Katsunori Yokoyama, Suntou-gun (JP); Shinji Yamamoto, Kawasaki (JP); Kazuaki Takahata, Kawasaki (JP); Kazumasa Shibata, Kawasaki (JP); Hiroki Kasama, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 15/072,782

(22) Filed: Mar. 17, 2016

(65) Prior Publication Data
US 2016/0273611 A1   Sep. 22, 2016

(30) Foreign Application Priority Data
Mar. 20, 2015   (JP) .................................. 2015-057873

(51) Int. Cl.
*F16F 15/08*   (2006.01)

(52) U.S. Cl.
CPC .......... *F16F 15/08* (2013.01); *F16F 2236/04* (2013.01)

(58) Field of Classification Search
CPC .......... F16F 15/08; F16F 3/087; F16F 3/0873; F16F 3/00; F16F 3/093; F16F 1/3737; F16F 3/08
(Continued)

(56) References Cited

U.S. PATENT DOCUMENTS 2,284,771 A * 6/1942 Schrak .................... F16F 3/093
                                              248/632
2,919,882 A * 1/1960 Barkalow ............... F16F 3/093
                                              248/573
(Continued)

FOREIGN PATENT DOCUMENTS

CN          20435981 U  *  5/2015
GB          1308955 A   *  3/1973  .............. F02B 77/13
(Continued)

OTHER PUBLICATIONS

Rie Endo, Katsunori Yokoyama, Shinji Yamamoto, Kazuaki Takahata, Kazumasa Shibata, Hiroki Kasama, and Satoru Nitobe, U.S. Appl. No. 15/072,633, filed Mar. 17, 2016.
(Continued)

*Primary Examiner* — Melanie Torres Williams
(74) *Attorney, Agent, or Firm* — Fitzpatrick, Cella, Harper & Scinto

(57) ABSTRACT

A damping structure includes a first frame on which a driving portion is mounted, a second frame provided at a position facing the first frame in a state being connected with the first frame, a projecting portion provided projectively from one frame toward the other frame of the first and second frames, and a damping member compressively held between the projecting portion and the other frame. The damping member has rigidity lower than rigidities of the first and second frames and of the projecting portion and has a loss factor, measured by a mechanical impedance method in the state being compressed between the projecting portion and the other frame, of 0.05 or more.

16 Claims, 25 Drawing Sheets

(58) Field of Classification Search
USPC .................................. 188/379, 380; 248/632
See application file for complete search history.

(56) References Cited

U.S. PATENT DOCUMENTS

| | | | | |
|---|---|---|---|---|
| 4,679,761 | A * | 7/1987 | Small | F16F 15/315 |
| | | | | 248/609 |
| 5,879,765 | A | 3/1999 | Marumoto et al. | |
| 5,927,699 | A * | 7/1999 | Nakajima | H02M 3/33576 |
| | | | | 267/140.13 |
| 7,384,029 | B2 * | 6/2008 | Itakura | G11B 33/08 |
| | | | | 267/140.11 |
| 2012/0066993 | A1 * | 3/2012 | Mommer | E04B 2/7412 |
| | | | | 52/309.4 |
| 2013/0180350 | A1 * | 7/2013 | Kraus | F16H 21/44 |
| | | | | 74/108 |
| 2014/0090581 | A1 * | 4/2014 | Schultz | F16F 15/067 |
| | | | | 108/57.12 |
| 2015/0021840 | A1 * | 1/2015 | Murayama | F16F 3/12 |
| | | | | 267/140.4 |

FOREIGN PATENT DOCUMENTS

| | | | |
|---|---|---|---|
| JP | 9-125558 A | 5/1997 | |
| JP | 2006-168652 A | 6/2006 | |
| JP | 2007-278411 A | 10/2007 | |
| WO | WO 2016047395 A1 * | 3/2016 | ............ F16F 15/08 |

OTHER PUBLICATIONS

Rie Endo, Katsunori Yokoyama, Shinji Yamamoto, Kazuaki Takahata, Kazumasa Shibata, and Hiroki Kasama, U.S. Appl. No. 15/073,887, filed Mar. 18, 2016.

* cited by examiner

○ : 1PIN DAMPING PIN DISPOSED POSITION

□ : 4PIN DAMPING PIN DISPOSED POSITION

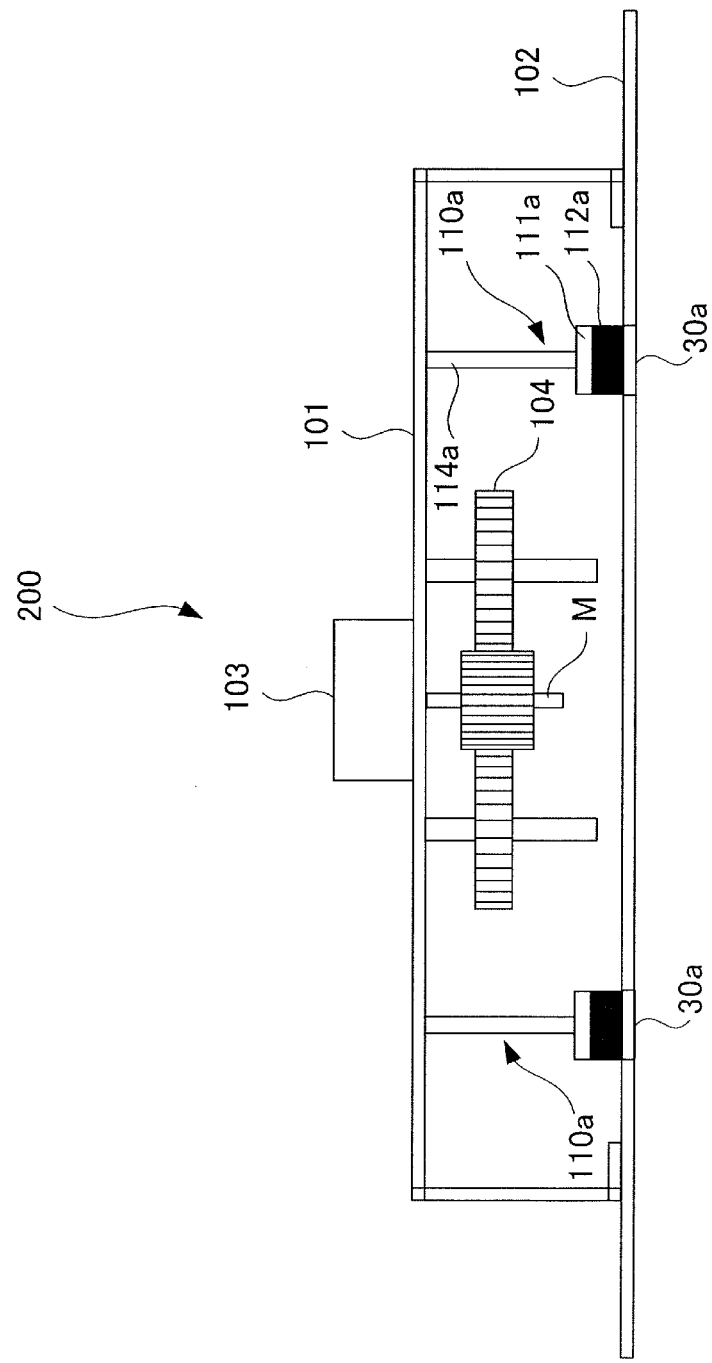

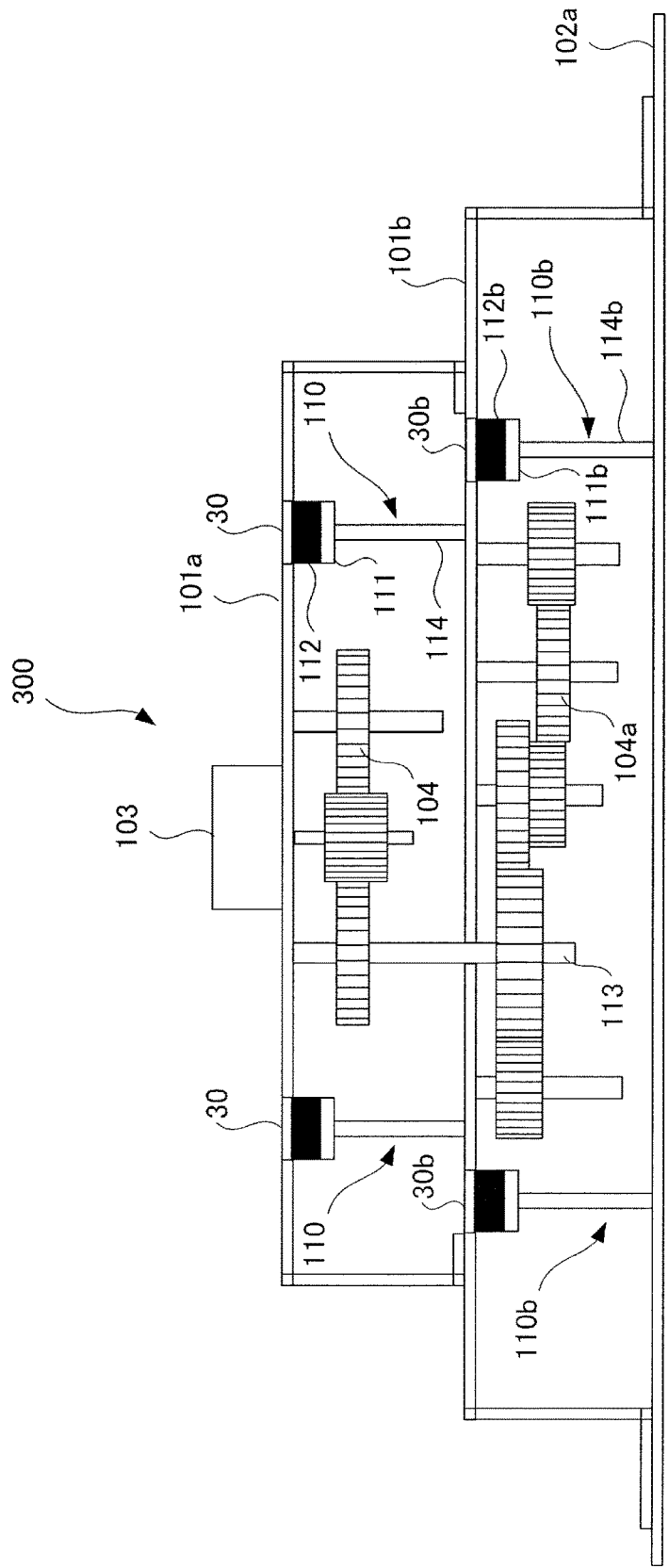

DAMPING STRUCTURE

BACKGROUND OF THE INVENTION

Field of the Invention

The present invention relates to a damping structure capable of reducing vibration transmitted from an exciter such as a motor to a frame.

Description of the Related Art

Lately, frames, such as a casing, are formed of a thin metal plate or the like to lighten a weight of various products such as office equipment (e.g., a printer), home appliances (e.g., a refrigerator), automobiles and construction materials. Such frames may radiate sound when vibration generated by an exciter, such as a motor, is transmitted to the frames. Then, there is a demand to reduce the vibration of a vibrated member, such as the frame, to which the vibration is transmitted from the exciter. For instance, a method of reducing the vibration of the vibrated member by pasting a damping member on a surface of a part or a whole of the vibrated member is conventionally known as disclosed in Japanese Unexamined Patent Application Publication No. 2006-168652, for example. Still further, as another method of reducing the vibration of the vibrated member, there is known a method of pasting a damping steel plate in which a damping member is interposed and welded between two metal thin plates on a surface of the vibrated member.

Japanese Unexamined Patent Application Publication No. 9-125558 also proposes a metal thin plate structure using a metal thin plate as a panel and configured such that an echo damping sheet is interposed between and in contact with a beam reinforcing the metal thin plate and the metal thin plate to reduce an echo sound generated when the metal thin plates are knocked.

In the construction field, there are many apparatuses reducing vibration by absorbing vibration energy of a vibration whose amplitude is large and whose frequency is low, such as vibrations being generated by earthquake or the like. For instance, Japanese Unexamined Patent Application Publication No. 2007-278411 proposes a damper in which inner and outer cylindrical rigid members are attached to two relatively movable different objects, respectively. These inner and outer cylindrical rigid members are connected in a body through a viscoelastic energy absorbing member. Specifically, both members are bonded in a body by vulcanizing a non-vulcanized rubber while filling between the inner and outer cylindrical rigid members or by foaming a resin material filling between them. Then, vibration generated between the two members is reduced by the viscoelastic energy absorbing member interposed between these two members.

However, the methods of pasting the damping member and the damping steel plate to the vibrated member have a problem that a number of components increases because these method require a large amount of damping members. Still further, because the damping steel plate is hard to work, i.e., to bend or to draw, it is difficult to install the steel plate in a case when a pasting position is limited.

The metal thin plate structure disclosed in Japanese Unexamined Patent Application Publication No. 9-125558 discloses a beam installed between two sides of one thin metal plate (frame). Because this structure requires a wide area to install the beam, a position where the beam can be installed is limited and it becomes hard to install the beam if many components are disposed on the metal thin plate. Still further, because the wider the area of the thin metal plate, the more a large amount of echo sound reducing sheet is required, becoming costly.

The damper described in Japanese Unexamined Patent Application Publication No. 2007-278411 has a large vibration reducing effect on vibrations whose amplitude is large and whose frequency is low, such as earthquake. However, the viscoelastic energy absorbing member is considered to hardly distort and the vibration reducing effect is small to mechanical vibration whose amplitude is small and whose frequency is high as compared to earthquake. Still further, it takes time to manufacture the damper because the both members are bonded in a body by vulcanizing the non-vulcanized rubber while filling between the inner and outer cylindrical rigid members or by foaming a resin material while filling between them. For instance, it is conceivable to fill rubber between the both members by bringing both members, manufactured by a metalworking factory, to a mill for material such as rubber. In this case, it takes more time to manufacturing, as compared to a case of manufacturing both members and the viscoelastic energy absorbing member separately and combining them in an assembly plant. In particular, it is hard to manufacture the damper in a state in which the inner and outer cylindrical rigid members are assembled with an object whose vibration is to be reduced or in a case when these both members are formed integrally with the object.

SUMMARY OF THE INVENTION

The present invention provides a damping structure capable of damping a vibration of a frame with a simple configuration. According to an aspect of the present invention, a damping structure includes a first frame on which a driving portion is mounted, a second frame provided at a position facing the first frame in a state being connected with the first frame, a projecting portion provided projectively from one frame toward the other frame of the first and second frames, and a damping member compressively held between the projecting portion and the other frame. The damping member has rigidity lower than rigidities of the first and second frames and of the projecting portion and has a loss factor, measured by a mechanical impedance method in the state being compressed between the projecting portion and the other frame, of 0.05 or more.

Further features of the present invention will become apparent from the following description of exemplary embodiments with reference to the attached drawings.

BRIEF DESCRIPTION OF THE DRAWINGS

FIG. 13 is a section view schematically illustrating a drive unit of a second embodiment.

FIG. 14 is a section view schematically illustrating a drive unit of a third embodiment.

DESCRIPTION OF THE EMBODIMENTS

First Embodiment

Figure 1:
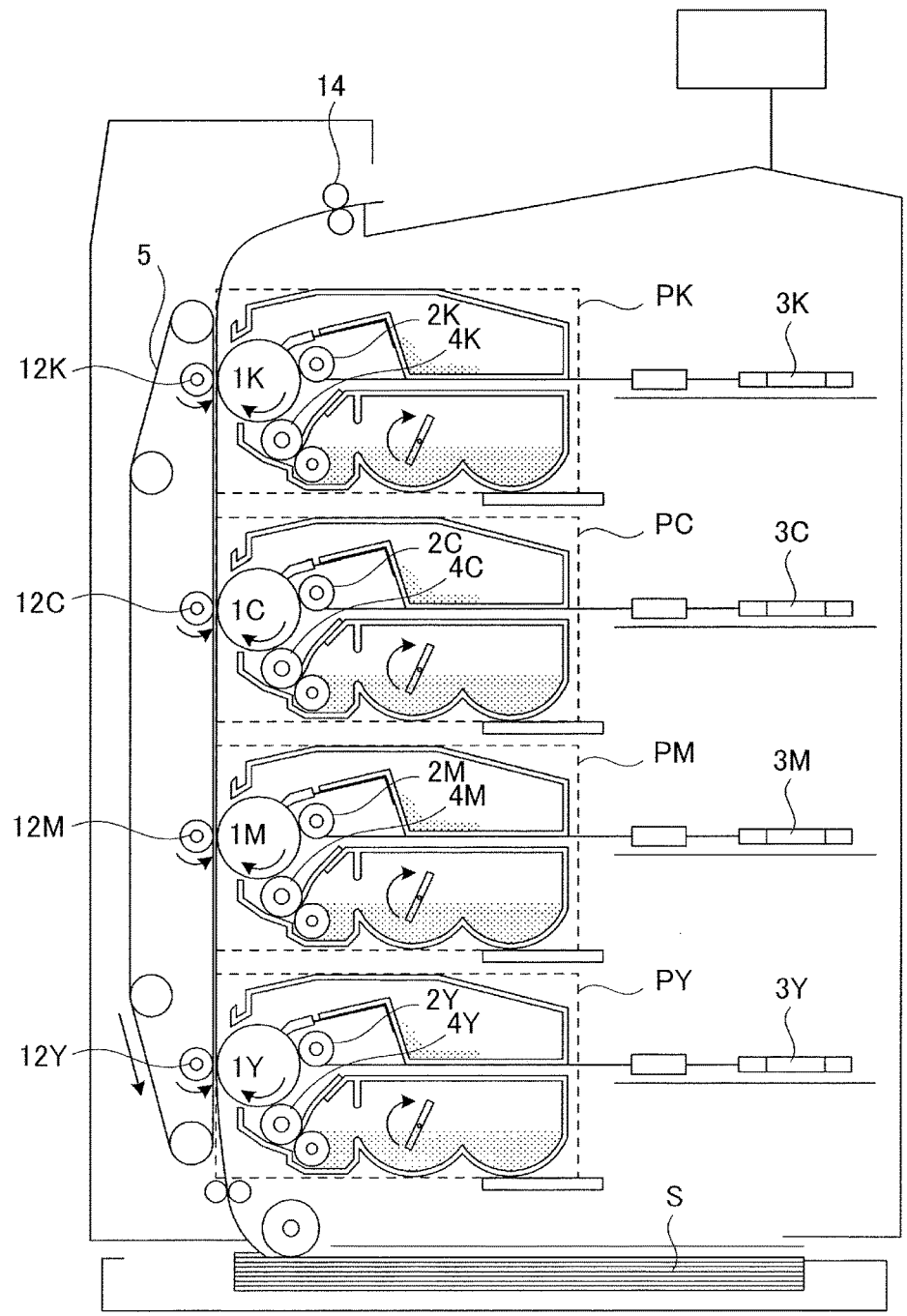
FIG. 1 is a schematic section view illustrating a structure of an image forming apparatus to which a damping structure is applicable.

Embodiments of the present invention will be described below in detail with reference to the drawings. At first, an image forming apparatus to which a damping structure of the invention is applicable will be described with reference to FIG. 1. The image forming apparatus shown in FIG. 1 is a tandem type direction transfer type full-color printer in which image forming portions PY, PM, PC, and PK are arrayed vertically along a transfer member conveying belt 5.

In the image forming portion PY, a yellow toner image is formed on a photosensitive drum 1Y and is transferred to a transfer member S, e.g., a recoding sheet, an OHP sheet, a sheet material such as cloth, to be borne and conveyed by the transfer member conveying belt 5. In the image forming portion PM, a magenta toner image is formed on a photosensitive drum 1M and is transferred to the transfer member S to be borne and conveyed by the transfer member conveying belt 5. In the image forming portions PM and PK, cyan and black toner images are formed respectively on the phase differences 1C and 1K and are transferred to the transfer member S to be borne and conveyed by the transfer member conveying belt 5. The transfer member S on which the four color toner images have been transferred is separated curvedly from the transfer member conveying belt 5 and is sent to a fixing unit 14. The transfer member S undergoes heat and pressure in the fixing unit 14 to fix the toner image on a surface thereof. Then, the transfer member S is discharged out of an apparatus body.

The image forming portions PY, PM, PC and PK are configured in the same manner except that colors of toners used in developing units 4Y, 4M, 4C, and 4K are different as yellow, magenta, cyan, and black. Then, the yellow image forming portion PY will be typically described below and the other image forming portions PM, PC, and PK will be described by replacing Y at the end of the reference symbol PY with M, C, and K.

The image forming portion PY includes a charging roller 2Y (primary charger), an exposure unit 3Y, a developing unit 4Y, and a transfer roller 12Y around the photosensitive drum 1Y, i.e., an image bearing member. The photosensitive drum 1Y includes a photosensitive layer formed around an outer circumferential surface thereof and is rotated clockwise in FIG. 1 with a predetermined process speed.

The charging roller 2Y electrifies the photosensitive drum 1Y with a homogeneous negative dark potential. The exposure unit 3Y scans a laser beam, in which scan line image data developing color separation image of each color, is ON-OFF modulated by a rotary mirror to form an electrostatic latent image on the surface of the photosensitive drum 1Y. The developing unit 4Y supplies the toner to the photosensitive drum 1Y to develop the electrostatic latent image as a toner image.

The transfer roller 12Y is in pressure contact with the transfer member conveying belt 5 to forma transfer portion of the toner image between the photosensitive drum 1Y and the transfer member conveying belt 5. Because a DC voltage of an opposite polarity from a charging polarity of the toner is applied to the transfer roller 12Y, the toner image borne on the photosensitive drum 1Y is transferred to the transfer member S on the transfer member conveying belt 5. So-called transfer residual toner left while being borne on the photosensitive drum 1Y after the transfer is removed by a drum cleaning unit not shown.

Drive Unit

Figure 2:
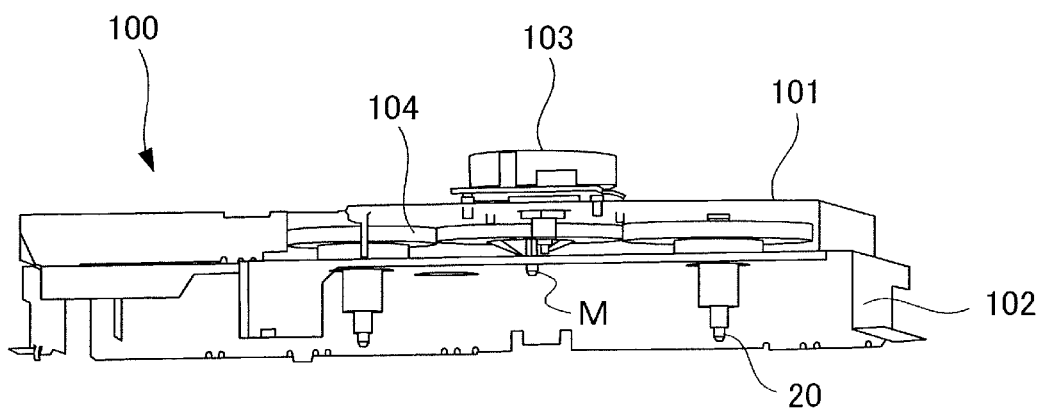
FIG. 2 is a section view illustrating a configuration of a drive unit seen from above.

In the present embodiment, the image forming portion PY does not operate alone and is configured as a process cartridge attached to the body of the image forming apparatus and operating by receiving a driving force and electric power transmitted/supplied from the apparatus body. Therefore, the body of the image forming apparatus is provided with a drive unit capable of removably attaching the process cartridge including the image forming portion PY. The image forming portion PY, i.e., the photosensitive drum 1Y, the charging roller 2Y, the developing unit 4Y and others, is operated through the drive unit. FIG. 2 illustrates the drive unit.

As shown in FIG. 2, the drive unit 100 is attached to a plate-like (plane) part of a main frame 102 of the apparatus body. The drive unit 100 includes a plate-like (plane) drive frame 101 facing the main frame 102. The drive frame 101 is provided with a driving motor 103 (i.e., a driving source) generating a rotational driving force, a gear train 104 in which a plurality of gears (i.e., rotators is combined) and a connecting portion 20 connecting a rotary shaft not shown of the phase difference 1Y or the like for example. The driving motor 103 is disposed on one surface side (back surface side) of the drive frame 101, and the gear train 104 and the connecting portion 20 are disposed on another surface side (on a side on which the photosensitive drum 1Y and others are mounted, front surface side) of the drive frame 101 opposite from the side on which the driving motor 103 is mounted. It is noted that in the specification of the present invention, the surface on which the photosensitive drum 1Y and others are mounted will be referred to as the 'front surface' and the surface opposite to that will be referred to as the 'back surface,' hereinafter, in terms of the respective frame surfaces of the drive unit 100 for convenience of the description. In the case of FIG. 2 for example, a part below the drive frame 101 in FIG. 2 corresponds to the front surface side, and a part under the drive frame 101 in FIG. 2 corresponds to the back surface side.

A motor shaft M of the driving motor 103 penetrates through a through hole (not shown) provided through the drive frame 101 and projects out to the front surface side. A driving gear composing one of the gears of the gear train 104 is attached to the motor shaft M. The rotational driving force generated by the driving motor 103 is transmitted to the connecting portion 20 through the gear train 104 to thereby rotate the photosensitive drum 1Y connected to the connecting portion 20.

By the way, the driving motor 103 and the gear train 104 of the drive unit 100 can be exciters generating vibrations which can be transmitted to the drive frame 101 and the main frame 102. The drive frame 101 may generate radiated sound when the vibrations are transmitted. In general, there is a case when the plate-like (plane) frame generates a keen solid propagation sound, i.e., a radiated sound, if irregular vibrations in a wide range are applied by exciting numerous resonances at once in a wide frequency range on the frame surface. In view of this point, it is necessary to reduce the vibration of the frame surface to reduce the radiated sound. Then, the present invention proposes a drive unit including a damping pin as a damping component capable of reducing the radiated sound caused by the vibration of the frame. This drive unit will be described in detail below. It is noted that for convenience of the drawings, a part of the drive unit such as the connecting portion 20 is not shown in the following drawings.

Figure 3:
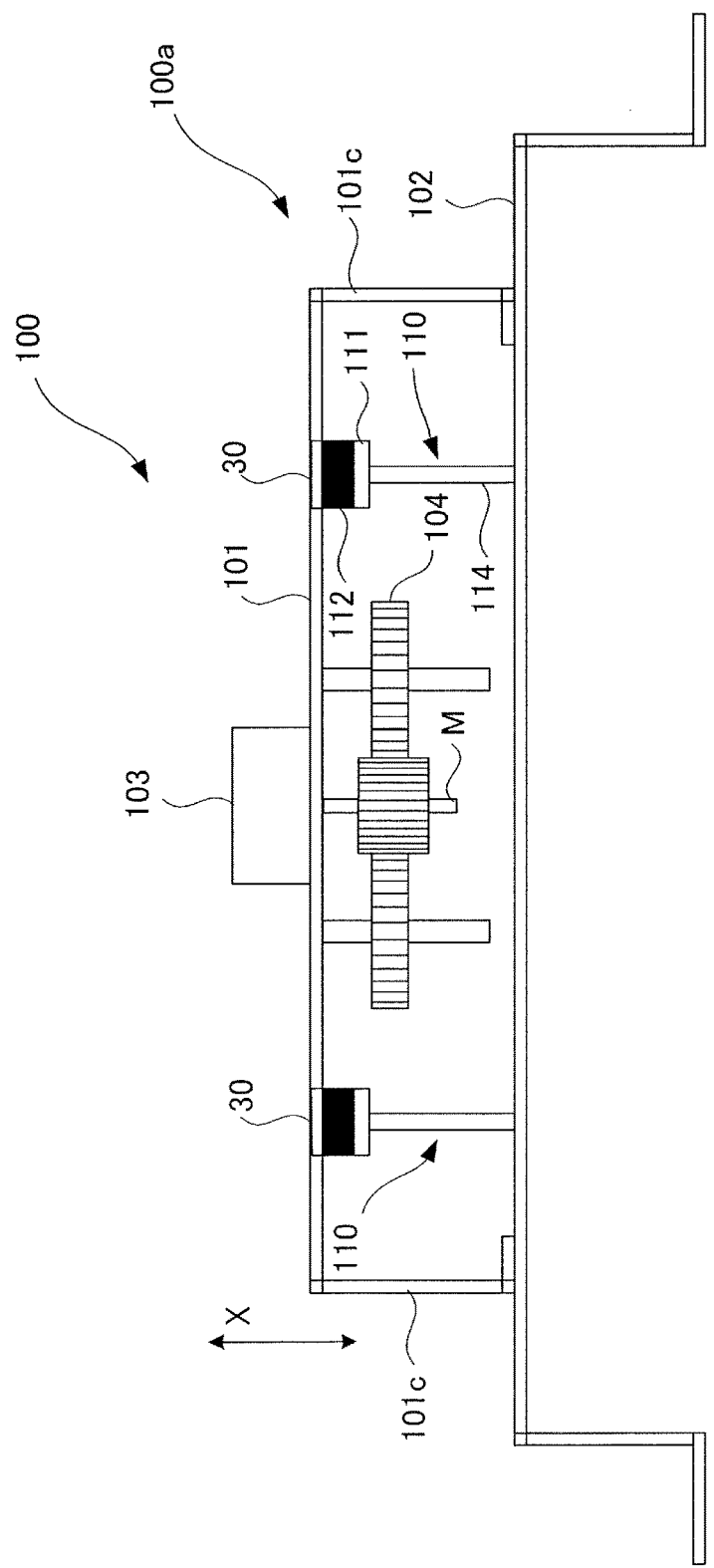
FIG. 3 is a section view schematically illustrating a drive unit of a first embodiment.

The drive unit of a first embodiment of the present invention will be described. At first, the drive unit will be described with reference to FIG. 3. The drive unit 100 shown in FIG. 3 is provided with a driving motor 103 and a gear train 104 on a drive frame 101. The drive frame 101, i.e., a first frame, is connected with a main frame 102, i.e., a second frame, at both end parts of one plate bent to the front surface side. The gear train 104 is stored within a space formed by the drive frame 101 and the main frame 102. That is, a driving portion (a first driving portion) including the driving motor 103 and the gear train 104 is mounted on the drive frame 101 and the main frame 102 is provided at a position facing the drive frame 101 in a state being connected with the drive frame 101. Because the drive frame 101 is connected with the main frame 102, the vibration generated by the driving motor 103 vibrates the drive frame 101. The vibration is transmitted to the main frame 102 through the drive frame 101 and vibrates the main frame 102.

As shown in FIG. 3, the drive unit 100 includes damping pins 110 extending from the main frame 102 toward the drive frame 101. One end (first end) of the damping pin 110 (more specifically, a pin member 114) is connected with the main frame 102 by means of a screw, caulking, welding, bonding, a magnet, or the like. The damping pin 110 is rigidly connected with the main frame 102 such that the damping pin 110 vibrates almost with same phase and amplitude with the main frame 102. One or a plurality of damping pins 110 is disposed at a spot where a vibration amplitude becomes large (more than an average vibration amplitude) or a spot where vibration amplitude becomes largest when the drive frame 101 vibrates. It is noted that the damping pin 110 may project from the drive frame 101 toward the main frame 102. That is, the damping pin 110, as a projecting portion may be provided to project from one frame toward the other frame among the first and second frames 101 and 102.

Another end (second end) of the damping pin 110 is configured to be able to hold a damping member 112 with the drive frame 101 without being connected with the drive frame 101. In other words, the damping member 112 is compressively held between the projecting portion 110 and the other frame of the first and second frames 101 and 102. The drive frame 101 is provided with a press-contacted surface 30, i.e., an opposed portion, at a position facing an end surface of the damping pin 110. The damping pin 110 holds the damping member 112 between and in pressure contact with the pin member 114 and the press-contacted surface 30 which is a part of a surface of the drive frame 101.

That is, the damping member 112 is held while being compressed between the pin member 114 and the press-contacted surface 30. For instance, the damping pin 110 can hold the damping member 112 in the state in which the damping member 112 of 3 mm in thickness is compressed by a compression amount of 500 µm (about 17%). Because the damping member 112 is used compressively, a damping member whose thickness before compression is thicker than a gap between the end surface of the damping pin 110 and the drive frame 101 is used as the damping member 112. Still further, because the damping member which is soft, i.e., whose hardness is lower, can be readily compressed, the damping member whose hardness is lower is suitably used for the damping pin 110. Specifically, the damping member 112 has rigidity lower than rigidities of the drive frame 101, the main frame 102 and the damping pin 110. Also, the damping member 112 has a loss factor, measured by a mechanical impedance method in the state being compressed between the damping pin 110 and drive frame 101 (one example of the other frame) of 0.05 or more. It is noted that the damping member 112 may be fixed to the drive frame 101 by means of a double-sided adhesive tape. The damping structure 100a for damping the vibration is formed by including the drive frame 101, the main frame 102, the damping pin 110 and the damping member 112 in the preset embodiment.

The damping member 112 is formed of a special acrylic rubber for example and is a vibration energy absorbing member whose loss factor measured by a mechanical impedance method in a compressed state is 0.05 or more. The damping member 112 has rigidity which lower than rigidities of the driving frame 101, the main frame 102 and the pin member 114. As such damping member 112, a damping material such as a high damping rubber sheet such as Lostomer manufactured by Kitagawa Industries Co., Ltd. may be cited. Damping is a technology of converting vibration energy around a resonant point of a structure into thermal energy, and the damping member reduces vibration of a vibrated member by converting vibration energy vibrating a surface of the vibrated member into thermal energy. The damping member also has such characteristics that its loss factor becomes higher than that before compression by being compressed, and the higher the loss factor of the damping member, the more the vibration of the vibrated member can be reduced. It is noted that the rigidity mentioned here is a concept expressing deformability and is specifically expressed by Young's modulus. The Young's modulus can be obtained by measuring by a tensile test.

There is a vibration-proof member that is similar, but different, from the damping member. Vibration proofing is a technology of suppressing vibration of a structure, such as a building, from transmitting vibration from a junction of a foundation to another structure or foundation, and the vibration-proof member is what blocks the vibration by reducing transmission rate of vibration between a vibration source generating the vibration and a vibrated member. If such vibration-proof member is used in the damping pin 110 described above, the vibration is only reflected at a spot where the vibration-proof member is provided by a vibration insulating effect of the vibration-proof member, and the vibration remains on a surface of the vibrated member and is not reduced. Therefore, radiated sound caused by vibration is barely reduced. Because it is almost unable to obtain an effect of reducing the vibration by the vibration-proof member as described above, the vibration-proof member is not suitable to be used in the damping pin 110.

The loss factor measured by the mechanical impedance method can be obtained by the following method. That is, sheet metal frames formed into a size of 150 mm×100 mm are disposed so as to face with each other and a damping member 112 of 10 mm in diameter is interposed at a center part between these two frames. Then, vibration is applied to the center part of either one frame by an exciter from a side opposite from a side on which the damping member 1 is disposed. A burst random signal (F) of a wide frequency range from 50 Hz to 5 KHz is given to the exciter to vibrate one frame in an out-of-plane direction. The other frame is provided with a plurality of acceleration pickups to obtain acceleration based on measured values at these response points. The acceleration thus obtained is converted into velocity (V) to find amplitude (|Z|) of mechanical impedance (F/V). Based on the amplitude, the loss factor (η) is found by the following equation:

$$\text{loss factor}(\eta) = |Z|/(2\pi f_0 m)$$

where $f_0$ is resonance frequency and m is amass of the damping member. The loss factor of the damping member 112 when it is compressed can be found by the method described above while compressing the damping member 112 after adjusting a distance between the two frames interposing the damping member 112.

Figure 4A:
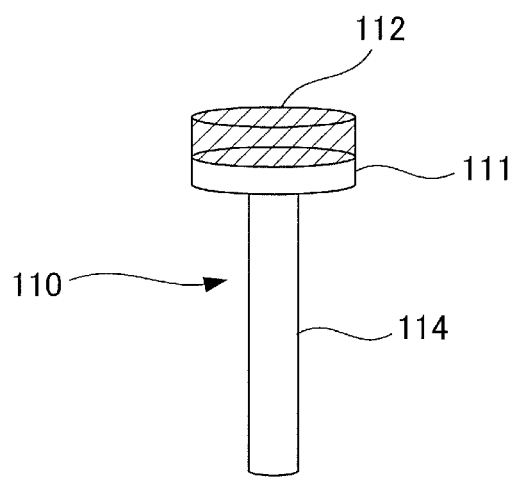
FIG. 4A is a perspective view illustrating a damping pin including a press member.
Figure 4B:
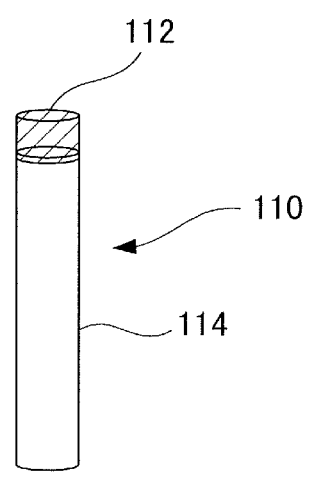
FIG. 4B is a perspective view illustrating a damping pin including no press member.

The damping pin 110 will be described with reference to FIGS. 4A and 4B. The damping pin 110 shown in FIG. 4A includes the damping member 112 and the pin member 114. SUS304 is used, for example, as a material of the pin member 114 (i.e., a projecting portion), and the pin member 114 is formed into a columnar shape of 5 mm in diameter, for example. The material and the shape of the pin member 114 are not limited to those described above. However, the pin member 114 is desirable to have rigidity greater than rigidity of the main frame 102 so that the vibration in the out-of-plane direction of the drive frame 101 is transmitted to the damping member 112 through the main frame 102. That is, the projecting portion 114 is formed such that its rigidity is greater than the rigidity of at least one frame among the first and second frames 101 and 102.

The damping pin 110 is provided with a press member 111 integrally with the end surface of the pin member 114. SUS304 for example is used as a material of the press member 111 and is formed into a shape of a disc of 15 mm in diameter and 5 mm in thickness. However, the material and the shape of the press member 111 are not limited to those described above as a matter of course. The damping member 112 is pasted to the press member 111 by means of a double-sided adhesive tape or the like. The press member 111 is provided in a case when an area of the end surface of the pin member 114 is extremely small. That is, if the area of the end face of the pin member 114 is small, it is difficult to uniformly compress and hold the damping member 112 of size required to reduce vibration. Then, in order to be able to hold the damping member 112 of the size required to reduce the vibration while uniformly compressing the damping member 112, the press member 111 having an area larger than that of the end face of the pin member 114 is provided. Accordingly, if it is possible to uniformly compress and hold the damping member 112 of the size enough for reducing the vibration, it is possible to hold the damping member 112 by the end face of the pin member 114 without providing the press member 111 as shown in FIG. 4B.

Returning to FIG. 3, if the driving motor 103 generates vibration, the drive frame 101 vibrates in the out-of-plane direction (in a direction of an arrow X in FIG. 3) in the drive unit 100 including the damping pin 110 described above.

Because the drive frame 101 is connected with the main frame 102, the vibration of the drive frame 101 is transmitted to the main frame 102. In response to that, the main frame 102 also vibrates in the out-of-plane direction, and in accordance with the vibration, the pin member 114 also vibrates. However, the vibration of the drive frame 101 is hardly synchronized in terms of phase and amplitude with the vibration of the pin member 114, and the press member 111 and the pin member 114 move while generating a phase difference. Therefore, the damping member 112, compressed between the drive frame 101 and the press member 111, generates shear stress and distorts in a compression direction (in the out-of-plane direction of the drive frame 101 or an axial direction of the pin member 114). Due to the distortion of the damping member 112, friction is generated within the damping member, and vibration energy vibrating the drive frame 101 is converted into thermal energy. Because the damping member 112 is adhered tightly with the both of the drive frame 101 and the press member 111, the friction is liable to be generated by the distortion, and vibration energy is efficiently converted into the thermal energy. As a result, the vibration of the drive frame 101 is reduced, and the sound pressure level of the radiated sound caused by the vibration is reduced.

The inventors conducted experimental study tests on the reducing effect of the radiated sound caused by vibration in a case when the drive unit 100 shown in FIG. 3 was used. Then, this experiment will be described with reference to FIGS. 5A through 12C.

Figure 5A:
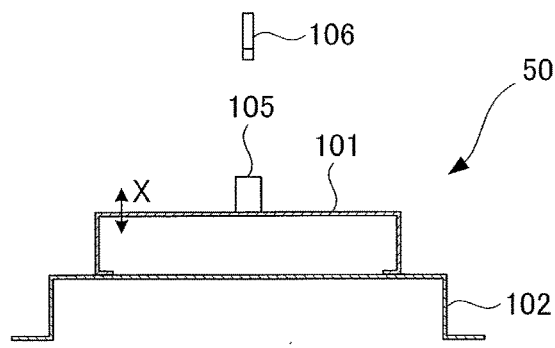
FIG. 5A is a section view schematically illustrating a configuration of an experimental simplified drive unit composed of only a frame.
Figure 5B:
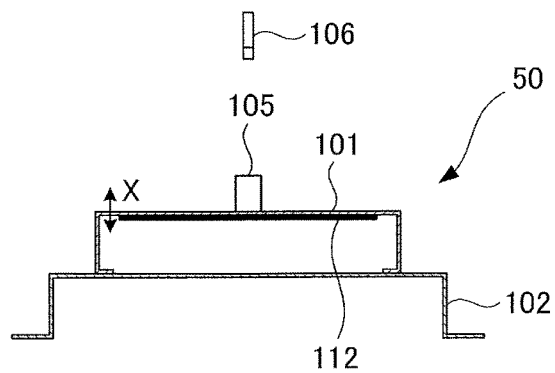
FIG. 5B illustrates a configuration of the experimental simplified drive unit in which a damping member is provided over an entire surface.
Figure 5C:
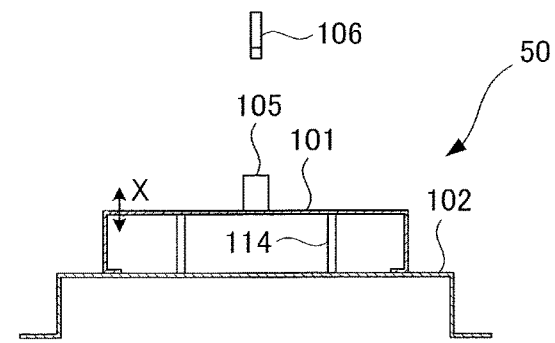
FIG. 5C illustrates a configuration of the experimental simplified drive unit in which only a pin member is provided.
Figure 5D:
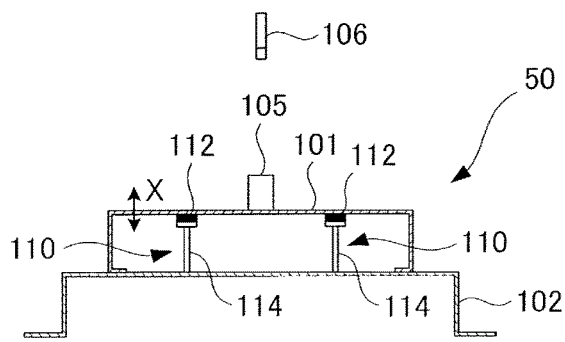
FIG. 5D illustrates a configuration of the experimental simplified drive unit in which the damping pin is provided.

FIG. 5A through 5D illustrate an experimental simplified drive unit 50 used in the experiment. The experimental simplified drive unit 50 is what simulates a drive unit that can be an exciter such as the motor 103 and the gear train 104 (see FIG. 3). FIG. 5D simulates a drive unit having the two damping pins 110, corresponding to the present embodiment. For comparison, the experiments were conducted also on each drive unit shown in FIGS. 5A through 5C. FIG. 5A is what simulates a drive unit including only the drive frame 101 on which an exciter 105 is mounted and the main frame 102. FIG. 5B is what simulates a drive unit in which the damping member 112 is pasted on an entire surface of the drive frame 101. FIG. 5C is what simulates a drive unit in which the drive frame 101 is connected with the main frame 102 by the pin members 114. It is noted that the damping member 112 used in the drive unit shown in FIG. 5D had an area (area in contact with the drive frame 101) of about a fifteenth part as compared to the damping member 112 used in the drive unit shown in FIG. 5B.

The frame of the experimental simplified drive unit 50 was formed of a zinc-coated steel plate of 1 mm in thickness, and two frames corresponding to the drive frame 101 and the main frame 102 were disposed in two stages of up and down and were connected. An exciter 105 was mounted at a center part of the drive frame 101. In this experiment, the burst random signal (F) of the wide frequency range from 50 Hz to 4 KHz was given to the exciter 105 to vibrate the drive frame 101 in the out-of-plane direction (in the direction of an arrow X in FIG. 5D). Then, sound pressure levels Pa (dB) of radiated sounds were measured by a microphone 106 by using Test.Lab (not shown) manufactured by LMS Co. The microphone 106 was installed at a position distant by 50 cm above the center part of the drive frame 101.

When irregular vibrations in a wide angle are applied to the frame, numerous resonances are excited at once in a wide frequency range on the surface of the frame, and the frame generates the radiated sound. If the vibration of the frame increases, sound pressure level of the radiated sound also increases. Then, it is possible to compare magnitude of the vibrations of the frame and hence to confirm a degree of reduction of the vibration by measuring the sound pressure level of the radiated sound. Still further, experimental vibration pickups (not shown) are installed on the drive frame to measure vibration level (m/s$^2$) of the drive frame 101. It is noted that because A weighting is applied to all of the sound pressure levels Pa (dB) in the present specification, frequency axes of the sound pressure levels indicated in the graphs are represented by ⅓ octave.

Figure 6A:
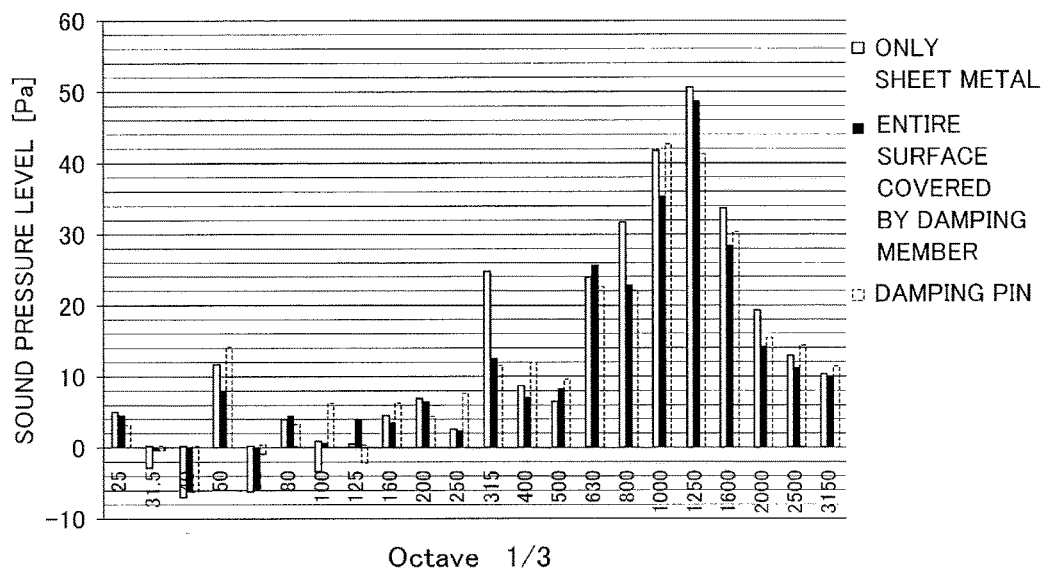
FIG. 6A is a graph indicating experimental results in terms of sound pressure levels of radiated sounds of the drive unit of the first embodiment and comparative examples.
Figure 6B:
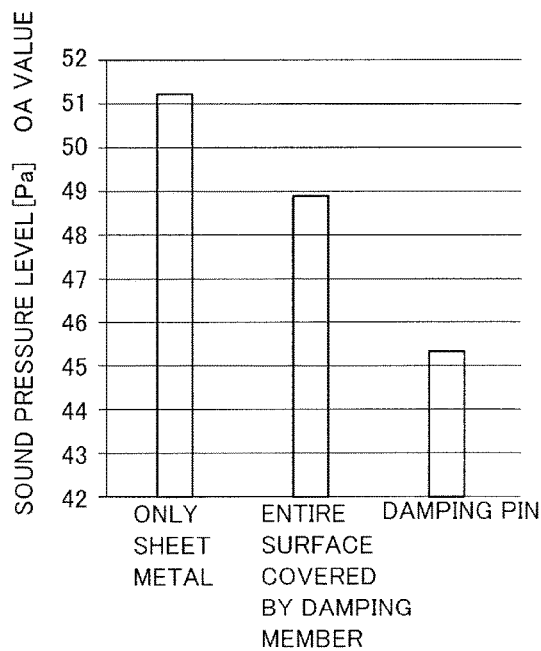
FIG. 6B is a graph indicating overall values of the sound pressure levels shown in FIG. 6A.

FIGS. 6A and 6B indicate results of the experiments of the cases of only the frames (only sheet metals) as shown in FIG. 5A, when the damping member 112 is pasted to the entire surface (the entire surface damping member) as shown in FIG. 5B, and when the damping pins 110 are included (the damping pin) as shown in FIG. 5D.

As is apparent from FIG. 6A, it is possible to reduce the sound pressure level of the radiated sound in a wide frequency band when the damping pins are included, as compared to the cases of only frames and when the damping member is pasted to the entire surface. It is also apparent by comparing overall values (dB) of the sound pressure levels (Pa) shown in FIG. 6B that it is possible to reduce the sound pressure level by about 2 dB when the damping member is pasted to the entire surface as compared to the case of only the frames. Meanwhile, it is possible to reduce the sound pressure level by about 6 dB when the damping pin is included, as compared to the case of only the frames. Even though only a small amount of damping member 112 is used, as compared to the case when the damping member is pasted to the entire back surface of the driving frame 101 (about fifteenth part in terms of the area for example), it is thus possible to obtain a large vibration reducing effect by the damping pin, as compared to not only the case of only the frames but also the case of pasting the damping member on the entire surface.

Figure 7A:
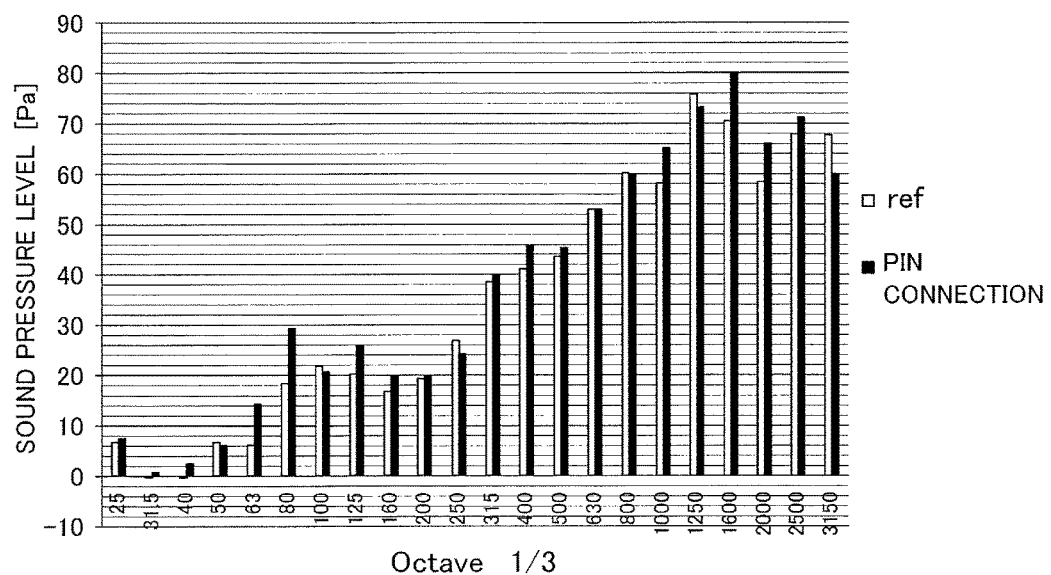
FIG. 7A is a graph indicating experimental results in terms of sound pressure levels of radiated sounds in a case when the frames are coupled only by the pin member.
Figure 7B:
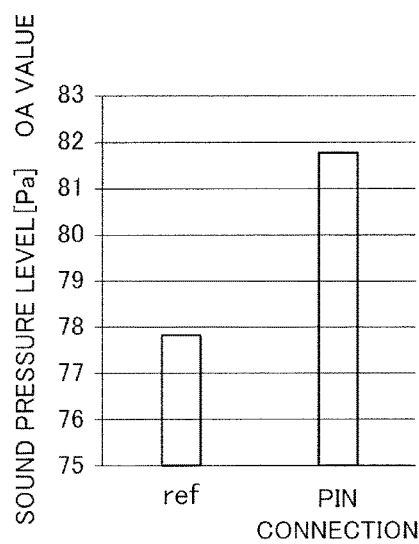
FIG. 7B is a graph indicating overall values of the sound pressure levels shown in FIG. 7A.

FIGS. 7A and 7B are graphs indicating experimental results of the case when the frames are directly connected by the pin member 114 as shown in FIG. 5C. The experimental results of the case of only the frames as shown in FIG. 5A are also indicated for comparison.

As shown in FIG. 7A, the sound pressure levels are almost the same in a wide frequency band or the sound pressure levels rise depending on specific frequency bands in the case of only the pin member 114 (pin connection) as compared to the case of only the frames (ref). Still further, as shown in FIG. 7B, the overall values of the sound pressure level of the case of only the pin member 114 increases by about 4 dB as compared to the case of only the frames. Thus, the case of only the pin member 114 resulted in increasing the radiated sound.

Rigidity as a whole of the drive unit 100 increases and the vibration is more efficiently transmitted among the frames through the pin member 114 when the frames are directly connected by the pin member 114 without interposing the damping member 112. Therefore, in order to reduce the radiated sound, one end side (first side) of the pin member 114 is arranged such that it is connected with the frame and the other end (second end) thereof is not connected with the frame as shown in FIG. 5D. Then, the drive unit 100 shown in FIG. 3 is arranged such that the damping pin 110 is connected only with the main frame 102 and is not connected with the drive frame 101. That is, the damping pin 110 only compressively holds the damping member 112 on the drive frame 101 side.

Figure 8A:
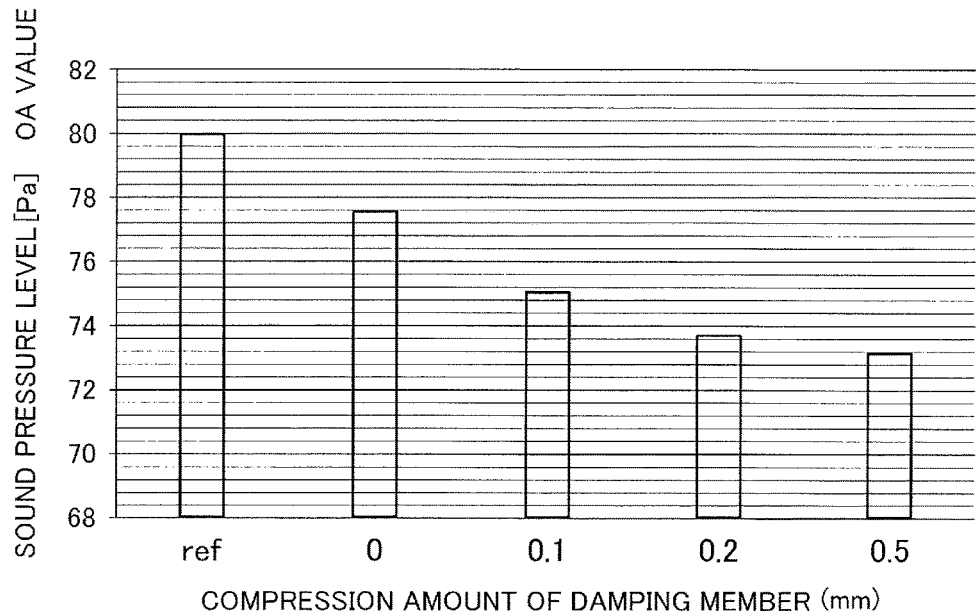
FIG. 8A is a graph indicating experimental results in terms of overall values of sound pressure levels of radiated sounds in a case when a compression amount of the damping member is varied.
Figure 8B:
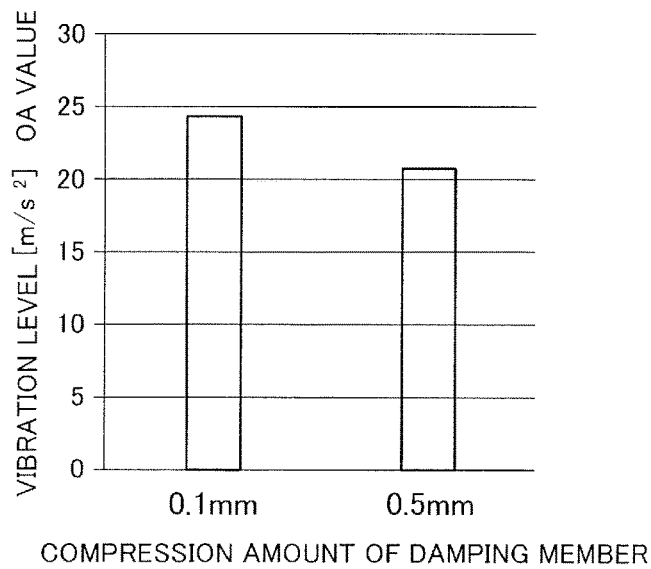
FIG. 8B is a graph indicating experimental results in terms of overall values of vibration levels in the case when the compression amount of the damping member is varied.

As described above, the damping member 112 has such a characteristic that its loss factor increases under compression more than the loss factor before compression. Then, the inventors verified through experiments that the higher the loss factor of the damping member 112, the more significantly the vibration of the drive frame 101 is reduced. FIGS. 8A and 8B indicate results of the experiments. FIGS. 8A and 8B are graphs indicating the experimental result in cases when the compression amount of the damping member 112 is varied in the case of including the damping pins 110 as shown in FIG. 5D. Experimental results of the case of only the frames (ref) as shown in FIG. 5A are also shown for comparison.

As shown in FIG. 8A, the sound pressure level of the radiated sound in the case of only the frame was about 80 dB. Meanwhile, the sound pressure level of the radiated sound of the case when the damping pins 110 are included was about 77.6 dB in a state in which the damping member 112 is not compressed (0 mm of compression amount). That is, the sound pressure level is smaller than the case of only the frames. Then, the sound pressure levels of the radiated sounds of the case when the damping member 112 was compressed by compression amounts of 0.1 mm, 0.2 mm, and 0.5 mm were about 75 dB, about 73.7 dB, and about 73.2 dB, respectively. That is, the more the compression amount of the damping member 112 increases, the less the sound pressure level of the radiated sound is.

Still further, as shown in FIG. 8B, vibration levels of the drive frame 101 when the damping member 112 was compressed by 0.1 mm and 0.5 mm were about 24 m/s$^2$ and about 21 m/s$^2$, respectively. The more the compression amount of the damping member 112 increases, the less the vibration level of the drive frame 101 becomes.

From the experimental results shown in FIGS. 8A and 8B, it is considered to be desirable to increase the compression amount of the damping member 112 as much as possible in order to reduce the sound pressure level of the radiated sound and the vibration level of the drive frame 101. However, if the compression amount of the damping member 112 is increased, a large stress is applied to the drive frame 101 and as a result, the drive frame 101 (or the main frame 102) may distort. If the frame distorts, the sound pressure level and the vibration level may significantly increase, remarkably in the case when the plurality of damping pins 110 is disposed in particular. This phenomenon occurs because the damping member 112 moves in a direction separating from the drive frame 101, thus reducing the compression amount of the damping member 112, or because the damping member 112 separates from the drive frame 101. In order to avoid this phenomenon, it is necessary to suppress the compression amount of the damping member 112 to a degree not causing the distortion in the frame. Still further, if the damping member 112 is compressed too much, the hardness of the damping member 112 increases and the damping member 112 hardly distorts along with the vibration of the frame. That is, the damping member 112 hardly causes shear deformation. If the damping member 112 causes no shear deformation, the vibration energy cannot be converted into the thermal energy. As a result, the vibration is not reduced and the sound pressure level of the radiated sound does not drop. In view of this point, an optimal compression amount of the damping member 112 is desirable to be larger than 0% and less than 50%, though it differs depending on the thickness of the damping member 112 before compression (thickness in the axial direction of the pin member 114) and on the hardness thereof. Still further, in view of that the damping member 112 is compressively used, it is desirable to use the damping member 112 whose hardness before compression is as low as possible.

Figure 9A:
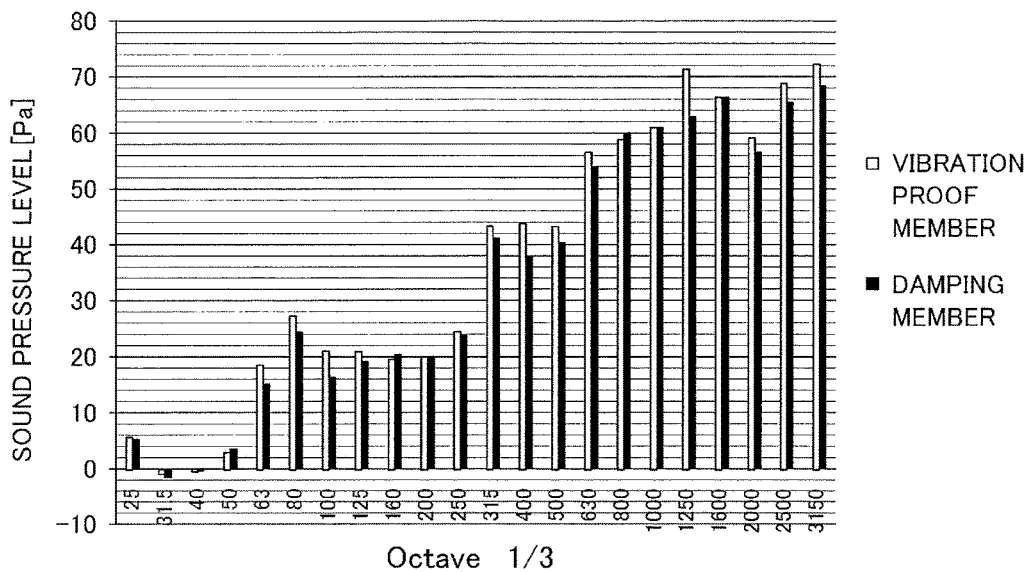
FIG. 9A is a graph indicating experimental results in terms of sound pressure levels of radiated sounds in cases when the damping member and a vibration-proof member are used.
Figure 9B:
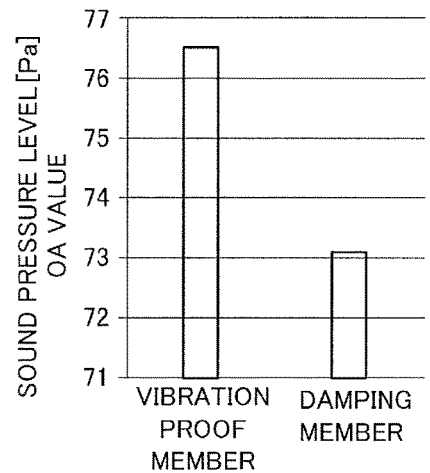
FIG. 9B is a graph indicating overall values of vibration levels shown in FIG. 9A.
Figure 9C:
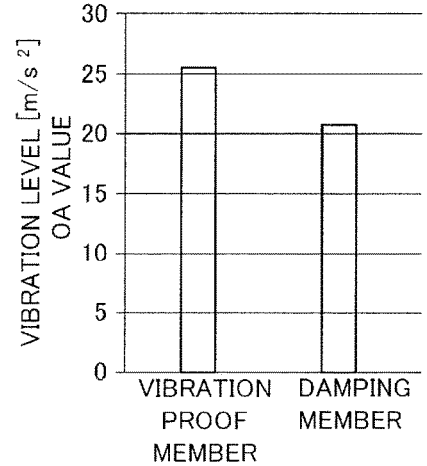
FIG. 9C is a graph indicating experimental results in terms of overall values of vibration levels in cases when the damping member and a vibration-proof member are used.

As described above, the material used for the damping pin 110 is the damping member 112, and a vibration-proof member is not used because the inventors verified that the radiated sound is barely reduced when the vibration-proof member is used for the damping pin 110. FIG. 9A is a graph indicating sound pressure levels of radiated sounds in the cases when the damping member was used for the damping pin 110 and when the vibration-proof member was used for the damping pin 110.

As it is apparent from FIG. 9A, the sound pressure levels of the radiated sounds were large in almost all frequency bands in the case when the vibration-proof member was used as compared to the case when the damping member was used. While an overall value of the sound pressure levels of the radiated sounds shown in FIG. 9B was about 73 dB in the case when the damping member was used, it was about 76.5 dB in the case when the vibration-proof member was used. While an overall value of the vibration levels of the drive frame 101 shown in FIG. 9C was about 21 m/s$^2$ in the case when the damping member was used, it was about 26 m/s$^2$ in the case when the vibration-proof member was used. That is, the overall value of the sound pressure level was larger by about 3.5 dB and the vibration level was larger by about 5 m/s$^2$ in the case when the vibration-proof member was used, as compared to the case when the damping member was used. Because the vibration-proof member has less effect of reducing the sound pressure level of the radiated sound and the vibration level as compared to the damping member as described above, the vibration-proof member is not suitable to be used for the damping pin 110.

Figure 10:
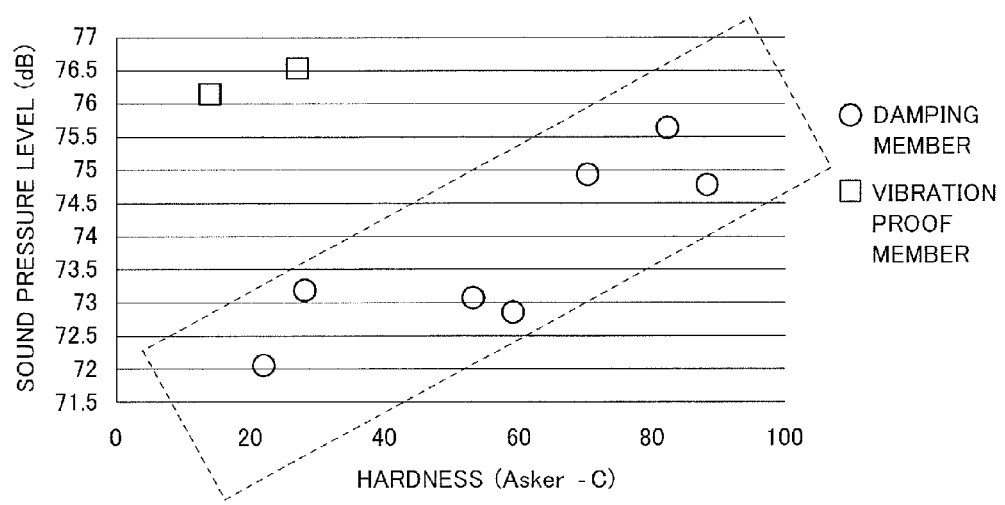
FIG. 10 is a graph indicating sound pressure levels of radiated sounds and vibration levels per hardness when damping members and vibration-proof members are used.

The inventors conducted experiments to verify the effect of reducing the radiated sound when the hardness of the damping member 112 is varied. FIG. 10 indicates the experimental results. In FIG. 10, an axis of ordinate represents the sound pressure levels of the radiated sounds and an axis of abscissa represents the hardness of the damping member. FIG. 10 indicates the hardness measured by Asker C durometer. The hardness may be measured also by JIS K6253 durometer and others for example as a matter of course. It is noted that FIG. 10 also shows experimental results of the radiated sound reducing effect in the case when the vibration-proof member is used for the damping pin 110 (indicated by square symbols in FIG. 10).

As shown in FIG. 10, the sound pressure levels of the radiated sounds increase when the hardness of the damping member 112 is increased and the sound pressure levels of the radiated sounds decrease when the hardness of the damping member 112 is reduced in contrary. It can be seen from this experimental results that the higher vibration reducing effect can be obtained when the hardness of the damping member 112 is low. That is, the damping member whose hardness is low has a relatively high loss factor from the beginning in general. While the hardness of the damping member 112 increases when it is compressed, an enough loss factor for converting vibration energy into thermal energy can be obtained even if the damping member 112 is compressed with a large compression amount if the hardness before compression is as small as possible. That is, it is possible to readily obtain a compression effect of increasing the loss factor by the damping member 112 whose hardness is low. Meanwhile, it is difficult to compress the damping member 112 whose hardness is high before compression from the beginning, and even if the damping member 112 can be compressed, the damping member 112 becomes too hard and hardly generates distortion. Thus, a damping member whose hardness is low is desirable as the damping member 112 used for the damping pin 110 because the compression effect can be readily obtained. Specifically, the damping member 112 is desirable to be 70 degrees or less for example in terms of Asker C hardness.

It is noted that as shown in FIG. 10, it is unable to obtain the vibration reducing effect like that of the damping member 112 by the vibration-proof member even its hardness is low. It is because the vibration-proof member has a low loss factor from the beginning and has a characteristic that the loss factor does not change so much even if the vibration-proof member is compressed. Therefore, vibration energy is hardly converted into thermal energy.

Figure 11A:
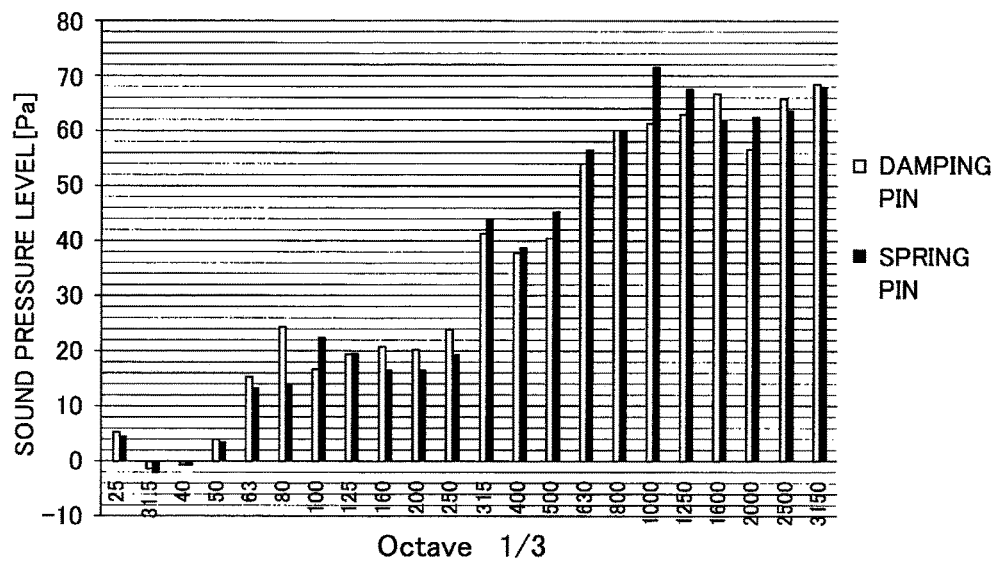
FIG. 11A is a graph indicating experimental results in terms of sound pressure levels of radiated sounds when the damping pin and spring pin are used.

The pin member 114 of the damping pin 110 is desirable to have rigidity at least higher than that of the main frame 102. That is, the rigidity of the pin member 114 is preferable to have the rigidity at least higher than the rigidity of the frame to which the pin member 114 is connected. FIG. 11A shows sound pressure levels of radiated sounds in the cases when the drive unit 100 includes the damping pin 110 and when the drive unit 100 includes a spring pin instead of the damping pin 110. The spring pin mentioned here refers to an elastic member such as a spring whose rigidity is lower than that of the pin member 114 as a shaft portion of the damping pin 110 shown in FIG. 4A.

Figure 11B:
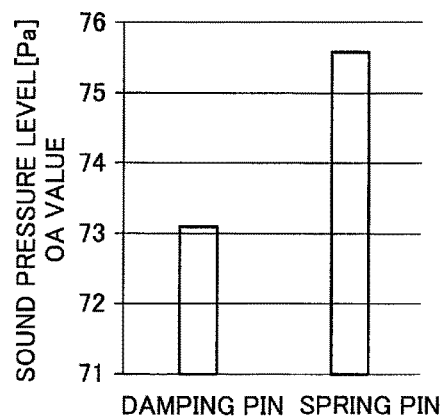
FIG. 11B is a graph indicating overall values of the vibration levels shown in FIG. 11A.
Figure 11C:
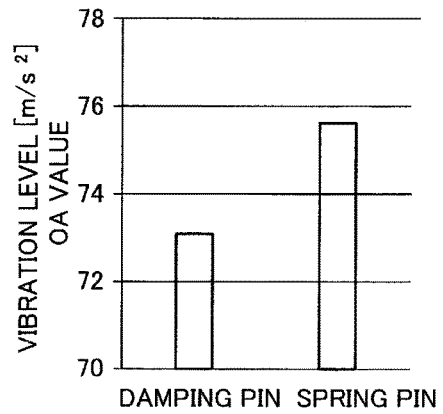
FIG. 11C is a graph indicating experimental results in terms of overall values of vibration levels when the damping pin and spring pin are used.

As is apparent from FIG. 11A, the sound pressure levels of the radiated sounds were large in the case of the spring pin as compared to those of the case of the damping pin 110 inmost frequency bands. Still further, as shown in FIG. 11B, while an overall value of the sound pressure levels of the radiated sounds was about 73 dB in the case of the damping pin 110, it was about 75.5 dB in the case of the spring pin. Still further, while the overall value of the vibration levels of the drive frame 101 was about 73 m/s$^2$ in the case of the damping pin 110, it was about 76 m/s$^2$ in the case of the spring pin. That is, the sound pressure level in terms of the overall value was large by about 2.5 dB and the vibration level was large by about 3 m/s$^2$ in the case of the spring pin as compared to those of the damping pin 110.

As described above, the effect of reducing sound pressure level of radiated sound and vibration level of the spring pin was low as compared to that of the damping pin 110 due to the following reasons. Because rigidity of the shaft portion of the spring pin is low, the drive frame 101 and only the shaft portion can vibrate together when the drive frame 101 vibrates. In such a case, the shaft portion functions like a vibration-proof member and the vibration is hardly transmitted to the damping member 112. Then, the distortion to be generated within the damping member 112 becomes small, the efficiency of converting vibration energy into thermal energy drops, and the high vibration reducing effect is hardly obtained. Meanwhile, because the shaft portion of the damping pin 110 is highly rigid, there is no such a case that only the shaft portion vibrates when the drive frame 101 vibrates. That is, when the drive frame 101 vibrates, the vibration is transmitted to the damping member 112 through the main frame 102 and thus the damping member 112 is distorted. Because friction is generated when the damping member 112 distorts, the efficiency of converting vibration energy into thermal energy is enhanced.

Desirably, the damping pin 110 is set at the frame whose contribution to structure-borne sound is high in a vicinity of a center position of a predominant vibration mode. The frame whose contribution to the structure-borne sound is high is a frame whose contribution has been studied to be high from results of study on which frame contributes highly to vibration and sound whose peak frequency is high by using vibration propagation path analysis, acoustical holography or the like. In the drive unit 100 of the first embodiment, the drive frame 101 corresponds to the frame whose contribution is high. Still further, the center position of the predominant vibration mode is a spot where vibration amplitude is large obtained as a result of measurement of a shape of an actual working mode of a targeted frequency in the frame whose contribution to the structure-borne sound is high. Specifically, it is preferable to dispose the damping pin 110 at the spot where the vibration amplitude is large when the drive frame 101 vibrates. The vibration energy is transmitted efficiently to the damping member 112 and the damping member 112 distorts largely by disposing the damping pin 110 at the spot where the vibration amplitude is large.

Figure 12A:
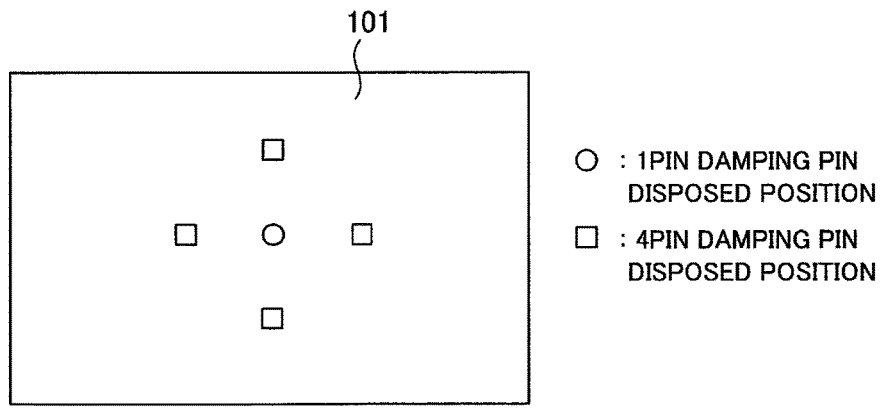
FIG. 12A is a chart indicating positions where the damping pins are disposed in the experiments when a number of the damping pins is varied.

The inventors conducted experiments to verify the radiated sound reducing effect in a case when the position where the damping pin 110 is disposed is differentiated. As shown in FIG. 12A, these experiments were conducted as for a case when the damping pin 110 is disposed at a center part of the drive frame 101 (indicated by a circle in FIG. 12A) where the vibration amplitude is largest and a case when the damping pin 110 is disposed at four positions (indicated by squares in FIG. 12A) other than the center part of the drive frame 101.

Figure 12B:
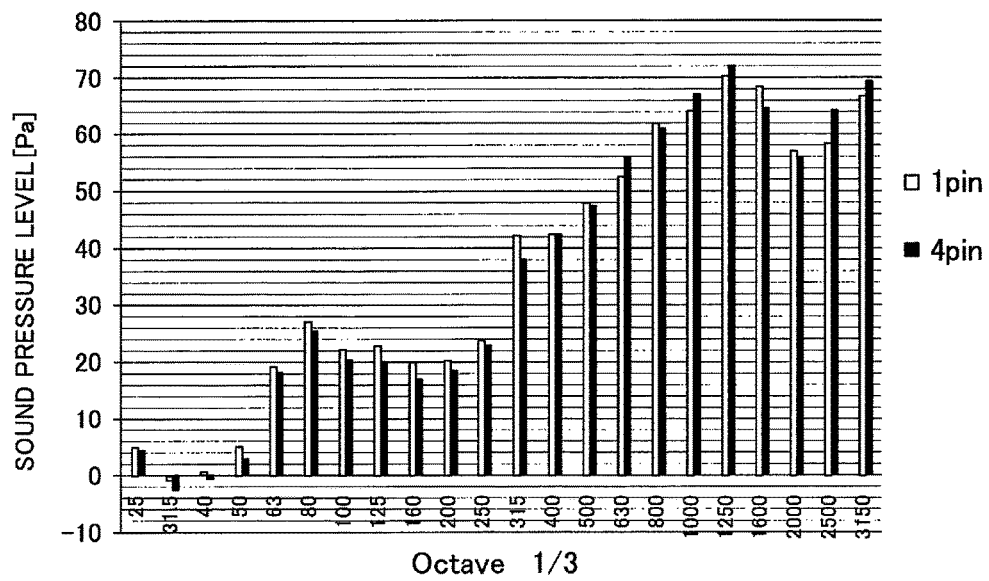
FIG. 12B is a graph indicating sound pressure levels of radiated sounds.
Figure 12C:
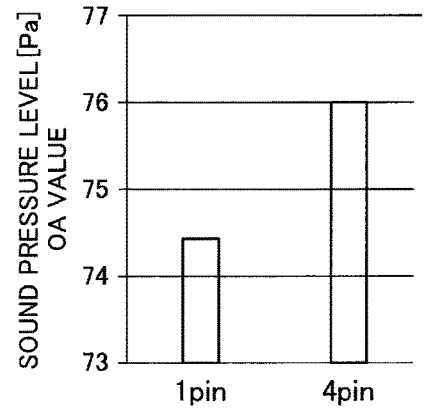
FIG. 12C is a graph indicating overall values of the sound pressure levels shown in FIG. 12B.

As indicated by sound pressure levels of radiated sounds in FIG. 12B, the sound pressure levels of the radiated sounds were reduced in most frequency bands in the case when the damping pin 110 is disposed only one spot where the vibration amplitude is largest, as compared to those of the case when the damping pin 110 is disposed at the four spots other than the center part. Still further, as is apparent from FIG. 12C, while the overall value of the sound pressure levels of the radiated sounds was about 74.5 dB when the only one damping pin 110 is disposed only at the spot where the vibration amplitude is largest, it was about 76 dB in the case when the damping pins are disposed at the four spots other than the center part on the drive frame 101. It can be seen from these experimental results that the enough vibration reducing effect can be obtained by one damping pin 110 if it can be disposed at the spot where the vibration amplitude is largest. Accordingly, although the damping pins 110 may be disposed at a plurality of spots if possible, it is desirable to dispose the damping pin 110 at the spot where the vibration amplitude is largest because the same vibration reducing effect can be obtained without wastefully increasing the number of damping pins if the damping pin can be disposed at the spot where the vibration amplitude is largest.

As described above, the drive unit 100 is configured to convert the vibration energy vibrating the drive frame 101 into the thermal energy by distorting the damping member 112 compressively held between the drive frame 101 and the damping pin 110. As the configuration to that end, the damping pin 110 compressively holding the damping member 112 and transmitting the vibration of the drive frame 101 to the surface opposite to the surface in contact with the drive motor 103 is provided between the drive frame 101 and the main frame 102. Thereby, the vibration of the drive frame 101 is efficiently transmitted to the both surface of the front and back surfaces of the damping member 112 (vibration transmission rate is high) and the damping member 112 is liable to generate distortion. This configuration is simple and because of the simplicity, the drive unit 100 can be downsized. Therefore, it is possible to obtain the vibration reducing effect more than the conventional method of pasting the damping member on the entire surface only with the considerably small amount of damping member 112. That is, it is possible to cut the cost considerably. Still further, because the damping pin 110 can be provided in a small space of the frame surface, the damping pin 110 can be installed readily even if a large number of components is disposed on the frame surface. Still further, because the damping member 112 and the pin member 114 are separate members, the damping pin 110 can be readily assembled between the drive frame 101 and the main frame 102 and can be manufactured readily. Still further, because the damping pin 110 can be provided at an arbitrary spot such as the spot where the vibration amplitude is large, the damping pin 110 can reduce the vibration more efficiently. Thus, it is possible to efficiently reduce the vibration and to considerably reduce the radiated sound caused by the vibration by providing the damping pin 110.

Second through seventh embodiments of the present invention will be described below. In order to make the following description be readily understood, mainly points different from the drive unit 100 of the first embodiment shown in FIG. 3 or from the drive unit of the embodiment to be compared will be described in detail in the following embodiments. The other configurations and operations are the same with those of the first embodiment or the drive unit of the embodiment to be compared.

Second Embodiment

At first, a second embodiment of the present invention will be described with reference to FIG. 13. A drive unit 200 shown in FIG. 13 is different from the drive unit 100 shown in FIG. 3 in that a direction of the damping pin 110a is opposite. That is, the damping pin 110a (specifically the pin member 114a) is rigidly connected with the drive frame 101, and a compressed surface 30a is provided on the main frame 102 at a position facing another end of the damping pin 110a. The damping pin 110a holds the damping member 112a by bringing the damping member 112a in pressure contact with the pressure-contacted surface 30a which is a part of the surface of the main frame 102. The damping member 112 is held in a state being compressed between the pin member 114 and the pressure-contacted surface 30a of the main frame 102. Such configuration is preferable to adopt in a case when a large number of components such as the gear train 104 is disposed on the front surface side of the drive frame 101 and there is a little space for bringing the damping member into pressure contact with the drive frame 101. Or, it is preferable to adopt such configuration in a case when the vibration transmitted from an exciter not shown other than the driving motor 103 affects the drive unit 100 through the main frame 102 for example.

Third Embodiment

A third embodiment of the present invention will be described with reference to FIG. 14. In a case when it is required to transmit the rotational driving force of the driving motor 103 through many gear trains 104 and 104a for example, a drive unit of a multi-stage configuration in which the drive frame 101 is constructed in multiple stages of not only one stage but also two stages or more is provided in the apparatus body. FIG. 14 shows a drive unit 300 of the two-stage configuration. The drive unit 300 shown in FIG. 14 is different from the drive unit 100 shown in FIG. 3 in that it is configured in two stages.

The drive unit 300 shown in FIG. 14 includes a drive frame 101a, i.e., a first frame, an intermediate frame 101b, i.e., a second frame, and a main frame 102, i.e., a third frame. The drive frame 101a is provided with the driving motor 103 and the gear train 104, i.e., a first exciter. The intermediate frame 101b is connected with the drive frame 101a on the back surface side thereof and is connected with the main frame 102 on the front side. That is, the main frame 102 is provided at a position facing the intermediate frame 101b in a state being connected with the intermediate frame 101b. The intermediate frame 101b is provided with a gear train 104a, i.e., a second exciter, on the front side thereof. One of gears of the gear train 104a is fixed to an idle gear shaft 113 extended to the front side of the intermediate frame 101b and is rotated by rotation of the idle gear shaft 113 which rotates through the gear train 104. Thereby, the rotational driving force of the driving motor 103 is transmitted to the gear train 104a. The drive frame 101a is connected such that the vibration caused by the gear train 104a is transmitted through the intermediate frame 101b. Accordingly, the drive frame 101a can be vibrated not only by the driving motor 103 and the gear train 104 but also by the gear train 104a. Still further, the intermediate frame 101b can be also vibrated not only by the driving motor 103 and the gear train 104, but also by the gear train 104a. The upper stage of the drive unit 300 is the same with the drive unit 100 shown in FIG. 3 except that the main frame 102 is replaced with the intermediate frame 101b. That is, the damping pin 110 is configured such that the pin member 114, i.e., a first projecting portion, is rigidly connected with the intermediate frame 101b. Then, the drive frame 101a is provided with the press-contacted surface 30, i.e., a first opposing portion, at a position facing another end of the damping pin 110. The damping member 112, i.e., a first damping member, is compressively held between the pin member 114 and the press-contacted surface 30 of the drive frame 101a.

Meanwhile, in the lower stage of the drive unit 300, a damping pin 110b, i.e., a second projecting portion, constructed in the same manner with the damping pin 110 is rigidly connected with the main frame 102. Then, the intermediate frame 101b is provided with a press-contacted surface 30b, i.e., a second opposing portion, at a position facing another end of the damping pin 110b. A pin member 114b of the damping pin 110b holds a second damping member 112b similar to the damping member 112 by pressing against the press-contacted surface 30b which is a part of the surface of the intermediate frame 101b. The second damping member 112b has rigidity lower than rigidities of the second and third frames 101b and 102a and of the second projecting portion 110b and has a loss factor, measured by the mechanical impedance method in the state being compressed between the second projecting portion 110b and the intermediate frame 101b, of 0.05 or more. Also, the second damping member 112b is compressed more than 0% and less than 50% from a thickness before compression. Accordingly, the second damping member 112b is compressively held between the pin member 114b and the press-contacted surface 30b of the intermediate frame 101b. In the case of the drive unit 300 constructed in the multistage as described above, it is possible to obtain a higher vibration reducing effect by pressing the damping members 112 and 112b at both of the drive frame 101a and the intermediate frame 101b. It is noted that the damping pin 110 may be provided to project from one frame to another frame of the first and second frames 101a and 101b and the damping pin 110b may be provided to project from one frame to another frame among the second and third frames 101b and 102a.

Fourth Embodiment

Figure 15:
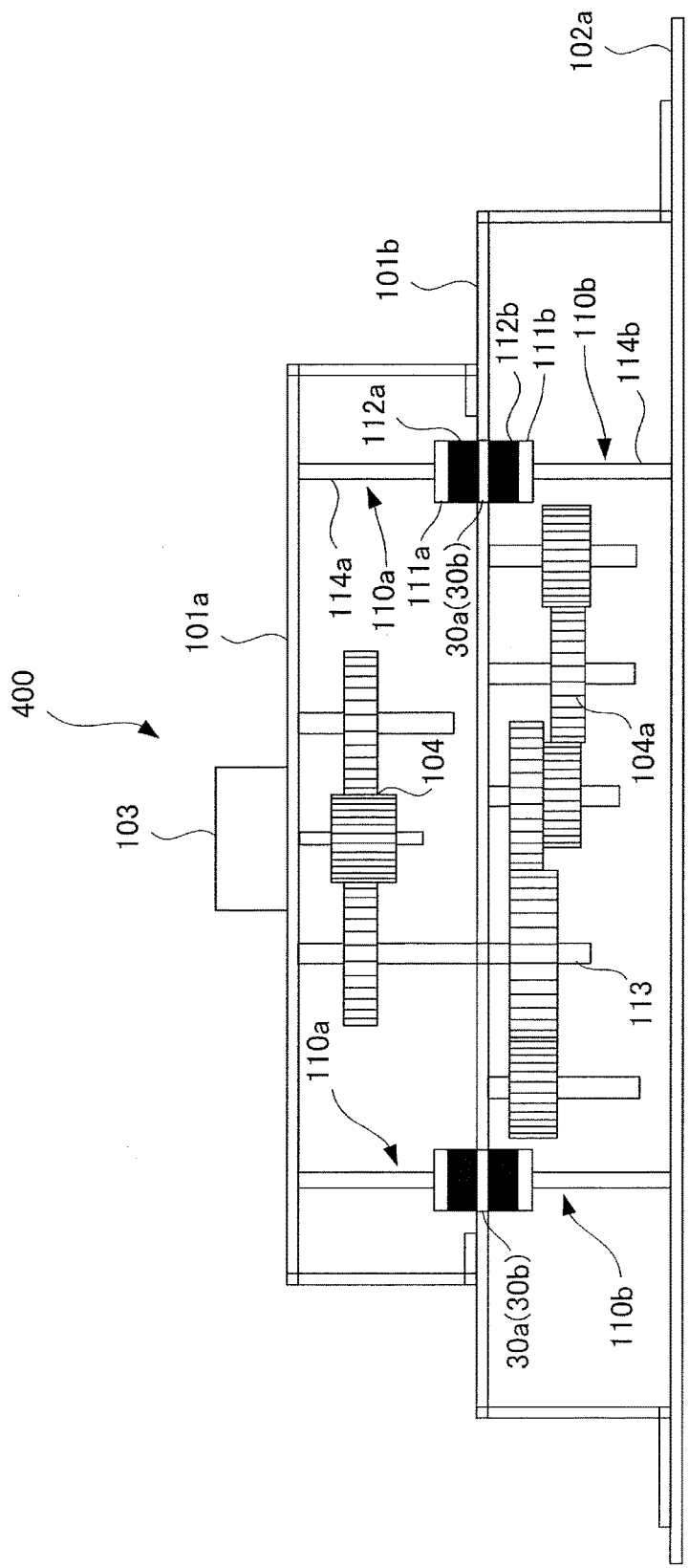
FIG. 15 is a section view schematically illustrating a drive unit of a fourth embodiment.

A fourth embodiment of the present invention will be described with reference to FIG. 15. A drive unit 400 shown in FIG. 15 is a drive unit of two-stage configuration. The upper stage of the drive unit 300 shown in FIG. 14 is replaced with the drive unit 200 shown in FIG. 13. However, the pressure-contacted surface 30a against which the pin member 114a of the damping pin 110a presses the damping member 112a and the press-contacted surface 30b against which the pin member 114b of the damping pin 110b presses the second damping member 112b are provided at a same position on the front and back surface sides of the intermediate frame 101b. That is, the damping pins 110a and 110b are disposed in opposite directions at positions facing with each other by interposing the intermediate frame 101b and compressing the damping member 112a and the second damping member 112b from the front and back surface of the intermediate frame 101b, respectively.

The following is a reason why the damping member 112a and the second damping member 112b are compressed while interposing the intermediate frame 101b. In the case of the drive unit 300 shown in FIG. 14 for example, if the compression amount of the second damping member 112b is increased to enhance the vibration reducing effect, the intermediate frame 101b possibly causes distortion. If the intermediate frame 101b distorts, it affects engagement of the gears of the gear train 104a, so that the gears may generate abnormal noise in some cases. However, in the drive unit 400 shown in FIG. 15, even if the damping member 112a and the second damping member 112b are compressed, compression stress applied to the intermediate frame 101b acts in a direction of cancelling with each other at the front and back surfaces and the intermediate frame 101b hardly distorts. If the respective compression stresses are almost equalized in particular, it is possible to reduce or almost to eliminate the distortion of the intermediate frame 101b. That is, the arrangement is made such that the compress stresses generated along with the compression are balanced or are reduced to prevent the distortion of the intermediate frame 101b that can be generated due to the compression of the damping member. This arrangement makes it possible to obtain the higher vibration reducing effect because the intermediate frame 101b hardly distorts even if the compression amount of the second damping member 112b is increased.

Fifth Embodiment

Figure 16:
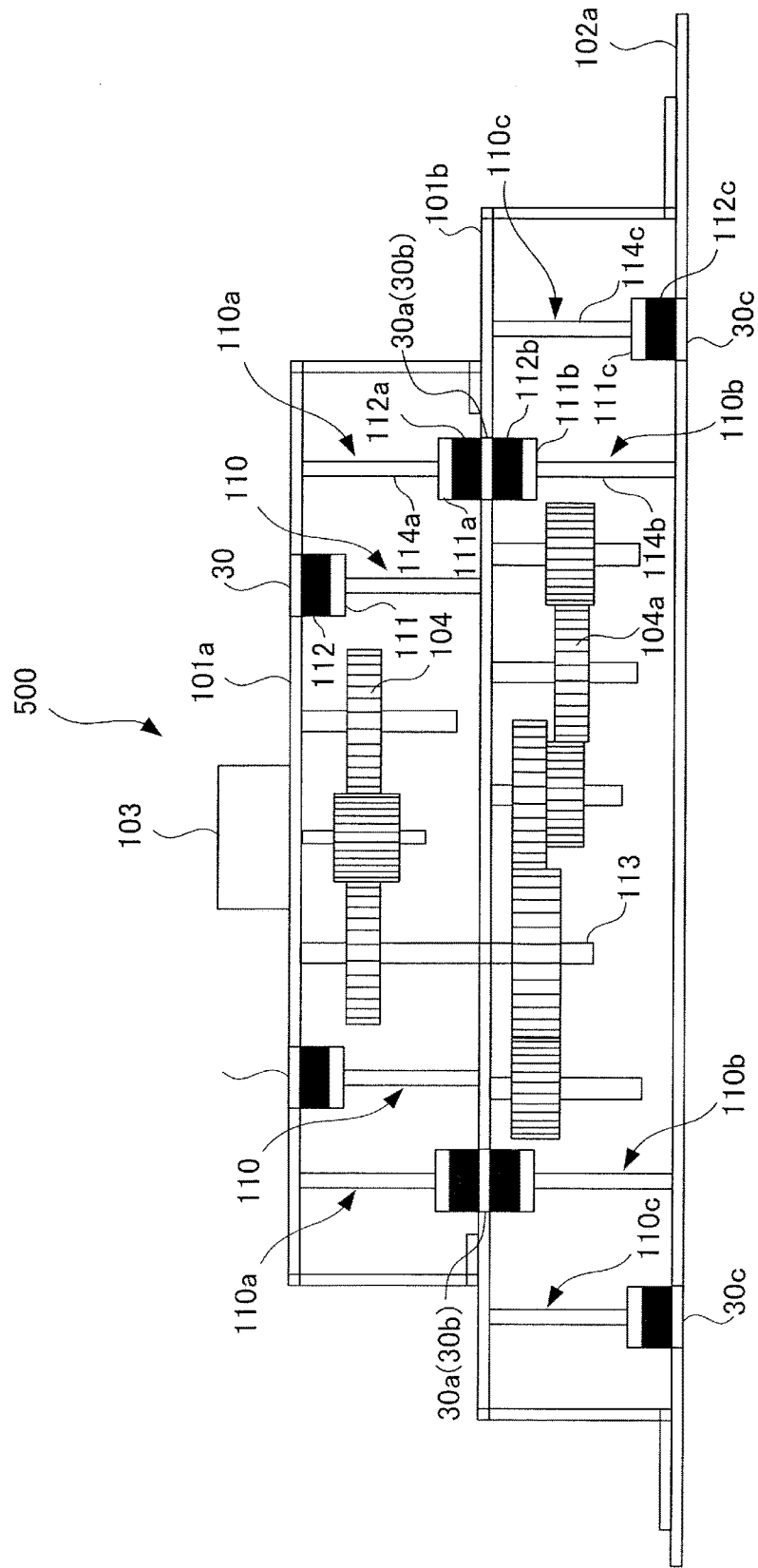
FIG. 16 is a section view schematically illustrating a drive unit of a fifth embodiment.

A fifth embodiment of the present invention will be described with reference to FIG. 16. A drive unit 500 shown in FIG. is what the damping pin 110 rigidly connected with the intermediate frame 101b and pressing the damping member 112 against the press-contacted surface 30 of the drive frame 101a is additionally provided on the upper stage side of the drive unit 400 shown in FIG. 15. Still further, a damping pin 110c rigidly connected with the intermediate frame 101b and pressing a damping member 112c against the press-contacted surface 30 of the main frame 102 is additionally provided on the lower stage side.

This arrangement makes it possible to reduce vibration of the drive frame 101 caused by the driving motor 103 and vibration of the main frame 102 caused by an external exciter (not shown) while minimizing the distortion of the drive frame 101. That is, in the case when the main frame 102 is vibrated by the external exciter, the vibration of the main frame 102 may be transmitted to the drive frame 101a, thus contributing to generation of radiated sound. Then, in such a case when vibration that contributes to the radiated sound is generated in the main frame 102 or the like, it is possible to obtain the high vibration reducing effect and to reduce the radiated sound by bringing the damping member into pressure contact with the main frame 102.

Sixth Embodiment

A sixth embodiment of the present invention will be described with reference to FIG. 17. A drive unit 600 shown in FIG. 17 includes a gear train 104 in which many more gears are combined as compared to that of the drive unit 100 shown in FIG. 3. In the drive unit 600 constructed as described above, the gears of the gear train 104 are liable to vibrate and radiated sound is generated by the vibration of the gears. In particular, idle gears are liable to vibrate because they are rotatably supported without being fixed to the idle gear shaft 113 and the vibration of the idle gear is liable to be transmitted to the drive frame 101 through the idle gear shaft 113. Therefore, it is effective to enhance the vibration reducing effect more to reduce, not only the vibration caused by the driving motor 103, but also the vibration of the idle gear shaft 113 itself.

Figure 17:
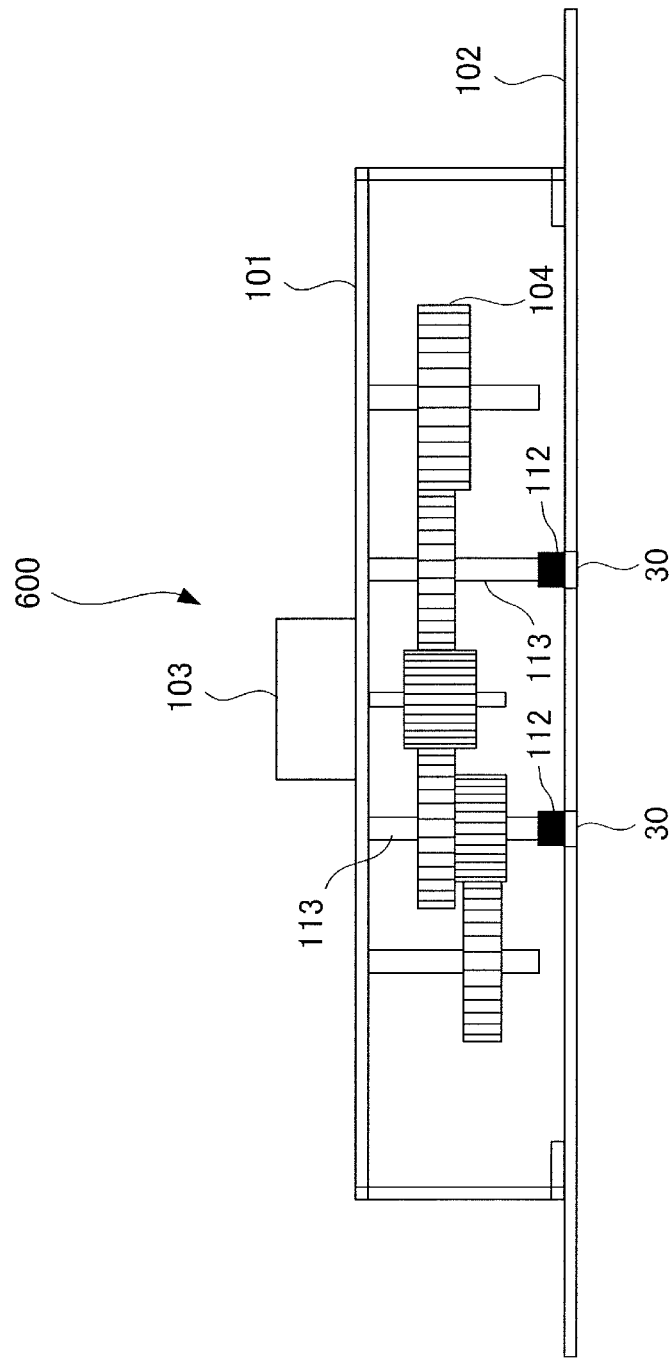
FIG. 17 is a section view schematically illustrating a drive unit of a sixth embodiment.

In the drive unit 600 shown in FIG. 17, while one end of the idle gear shaft 113 is connected with the drive frame 101, the other end thereof is not connected with the main frame 102. Then, the damping member 112 is disposed in a space generated between the end face of the idle gear shaft 113 and the main frame 102. That is, in the drive unit 600 shown in FIG. 17, the idle gear shaft 113 functions also as the pin member of the damping pin, and the damping member 112 is compressively held between the end face of the idle gear shaft 113 and the press-contacted surface 30 of the main frame 102. This arrangement makes it possible to efficiently reduce vibration even if the vibration is transmitted from the idle gear to the idle gear shaft 113 because the vibration is reduced before structurally propagated to the drive frame 101 at a moment of time when the vibration is transmitted to the idle gear shaft 113. Still further, if it is difficult to provide the damping pin 110 as shown in FIGS. 4A and 4B anew in terms of a space, it is possible to provide the damping member readily by actively using the idle gear shaft 113 as described above.

It is noted while the damping member 112 is disposed as it is on the end face of the idle gear shaft 113 in the drive unit 600 shown in FIG. 17, the invention is not limited to such configuration. For instance, it is also possible to provide the press member 111 at the end face of the idle gear shaft 113 to compress a larger damping member 112. Still further, the damping pin 110 including the pin member 114 (see FIG. 3) and the damping pin using the idle gear shaft 113 instead of the pin member may be used in combination.

Seventh Embodiment

Figure 18:
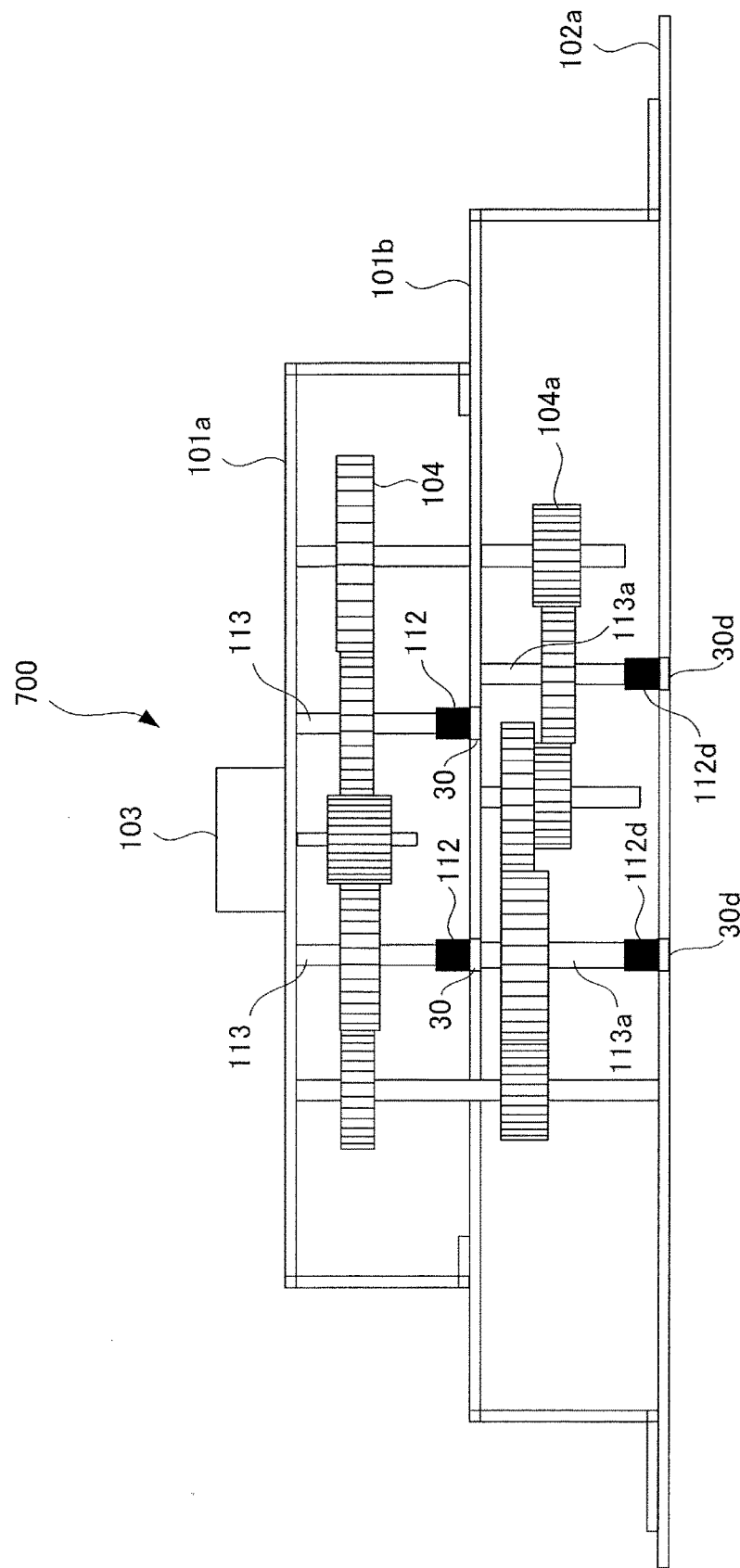
FIG. 18 is a section view schematically illustrating a drive unit of a seventh embodiment.

A seventh embodiment of the present invention will be described with reference to FIG. 18. A drive unit 700 shown in FIG. 18 is different from the drive unit 600 shown in FIG. 18 in that the drive unit 700 is configured in two stages. In the drive unit 700 shown in FIG. 18, the idle gear shaft 113 and an idle gear shaft 113a function as the pin members of the damping pins in the upper and lower stages, respectively. That is, as shown in FIG. 18, the damping member 112 is disposed between the end face of the idle gear shaft 113 and the press-contacted surface 30 of the intermediate frame 101b and is compressively held between them. Still further, a damping member 112d is disposed between an end face of an idle gear shaft 113a, i.e., a second fixed shaft, and the main frame 102 and is compressively held between them. This arrangement makes it possible to efficiently reduce the vibration even in the case of the two-stage structure because the vibration that possibly vibrates the drive frame 101a can be reduced before it is structurally propagated to the drive frame 101a by compressing the damping member 112 by the end face of the idle gear shafts 113 and 113a.

Eighth Embodiment

An eighth embodiment of the present invention will be described with reference to FIGS. 19 through 21. In a drive unit 800 shown in FIG. 19, the drive frame 101 and the main frame 102 formed of zinc plated steel plates of 1 mm in thickness are disposed so as to face with each other. The driving motor 103, i.e., the driving source, is fixed on the back surface side of the drive frame 101, and a motor shaft M penetrates through a through hole 40 provided through the drive frame 101 and extends to the front surface side of the drive frame 101. A pinion gear 122 is attached at a tip of the motor shaft M. The pinion gear 122 is engaged with an idle gear 123 supported by an idle gear shaft 113 and the idle gear 123 is engaged with an output gear 125, thus composing the gear train 104. The output gear 125 is connected with an output shaft 128 and the output shaft 128 penetrates through a through hole 41 provided through the main frame 102 to extend to the front surface side and is coupled with a process cartridge or the like not shown. Thereby, the rotational driving force of the driving motor 103 is transmitted to the process cartridge not shown through the respective gears of the gear train 104. It is noted that the drive frame 101 and the main frame 102 may be or may not be connected from each other.

Figure 19:
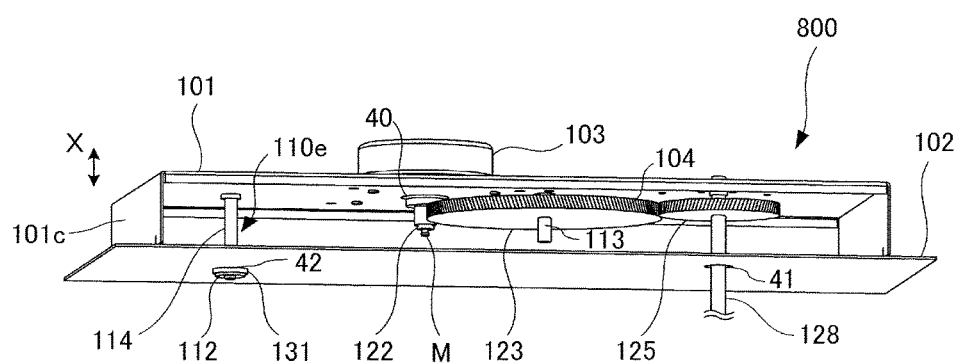
FIG. 19 is a section view schematically illustrating a drive unit of an eighth embodiment.

The drive unit 800 shown in FIG. 19 includes a damping pin 110e extending from the drive frame 101 to the main frame 102. One end of the damping pin 110e (more specifically the pin member 114) is connected with the drive frame 101 by such connecting methods of a screw, caulking, welding, bonding and a magnet. The damping pin 110 is rigidly connected with the drive frame 101 such that the damping pin 110 vibrates with same phase and amplitude with the drive frame 101.

Meanwhile, the other end of the damping pin 110 penetrates through a through hole 42 provided through the main frame 102 without being connected with the main frame 102. The through hole 42 is provided with the damping member 112 and a projecting portion 131 is formed around the through hole 42 (see FIG. 20 described later). The damping pin 110e brings the damping member 112 into pressure contact with the projecting portion 131, i.e., an opposing portion. That is, the damping member 112 is compressively held between the pin member 114 and the projecting portion 131. Still further, the rigidity of the pin member 114 of the damping pin 110e is desirable to be greater than the rigidity of the drive frame 101, such that the vibration in the out-of-plane direction of the drive frame 101 (in a direction of X in FIG. 19) is transmitted to the damping member 112 through the pin member 114. The damping pin 110e is disposed at one or a plurality of spots where the vibration amplitude becomes largest when the drive frame 101 vibrates.

Figure 20:
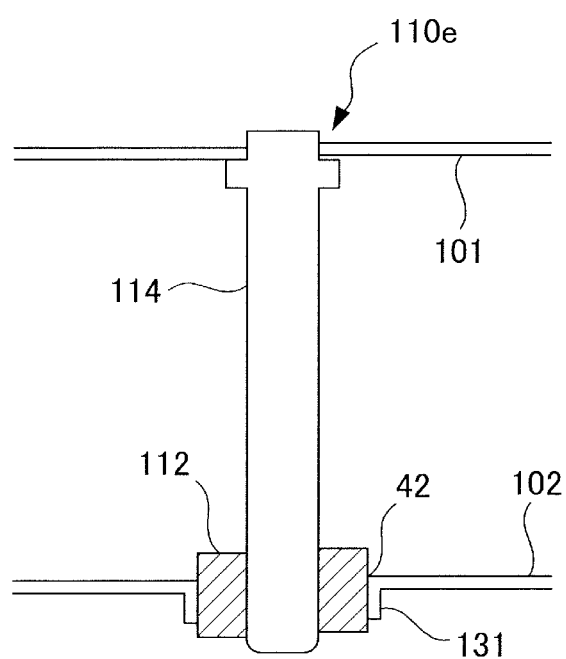
FIG. 20 is a section view illustrating a damping pin.

As shown in FIG. 20, the main frame 102 is provided with the projecting portion 131, i.e., the opposing portion, surrounding the circular through hole 42 perforated by means of burring of 11 mm in diameter. The projecting portion 131 is formed by bending a part of the main frame 102 to the front surface side along the through hole 42 for example. The cylindrical damping member 112 in 11 mm in outer diameter and 5 mm in inner diameter is fixed inside of the projecting portion 131. The damping member 112 is configured such that the other end of the pin member 114 made of SUS of 5.5 mm in diameter for example and whose one end is connected with the drive frame 101 can be press-fitted into the damping member 112. The damping member 112 is fixed in the state in which the damping member 112 is in contact with a circumferential surface of an end part of the pin member 114 press-fitted as described above. Thus, the damping member 112 is compressively held in a shaft diameter direction of the pin member 114 (in a direction intersecting with a direction in which the pin member 114 extends) between the projecting portion 131 on the outside and the pin member 114 on the inside. It is noted that because the damping member 112 is the same with those used in the respective embodiments described above, an explanation thereof will be omitted here.

Figure 21A:
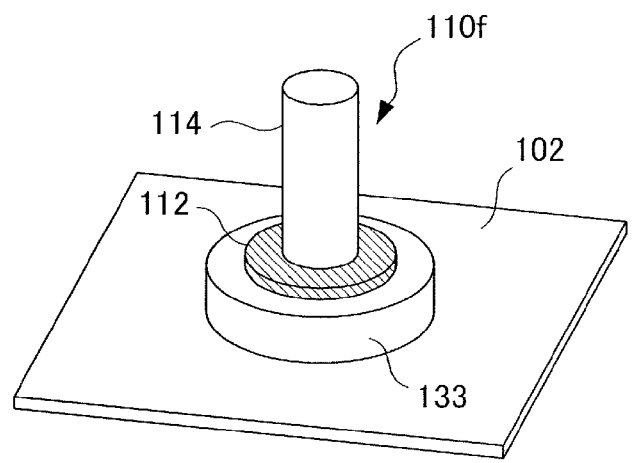
FIG. 21A is an enlarged perspective view illustrating a connecting portion of the damping pin and the frame.

The projecting portion 131 compressing the damping member 112 with the pin member 114 is not limited to be one formed by bending the part of the main frame 102 as described above. For instance, as shown in FIG. 21A, a cylindrical resin-made ring member 133 may be attached to the main frame 102 instead of forming the projecting portion 131. A damping pin 110f shown in FIG. 21A is composed of the pin member 114, the damping member 112, and the ring member 133, i.e., an opposing portion, and compressively holds the damping member 112 between the pin member 114 and the ring member 133. It is noted that the ring member 133 may be provided so as to project to the front surface side or to the back surface side. Still further, the ring member 133 may be provided so as to project to both front and back surface sides.

Figure 21B:
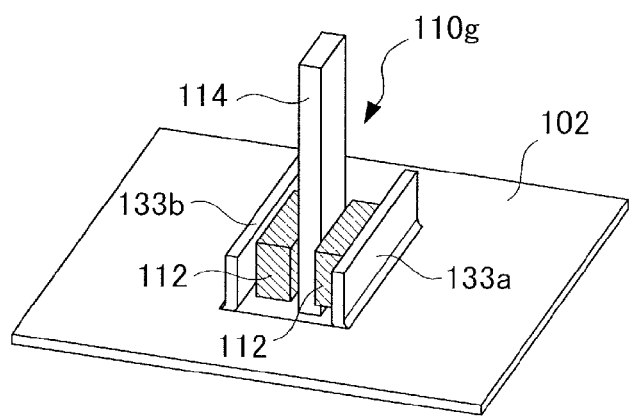
FIG. 21B is an enlarged perspective view illustrating another connecting portion of the damping pin and the frame.

Still further, the pin member 114 and the ring member 133 may be formed into a polygonal shape such as square and hexagonal shapes. That is, the shapes of the projecting portion 131, the ring member 133, and the pin member 114 are not specifically limited as long as the damping member 112 can be held in the state of being compressed in the shaft diameter direction of the pin member 114 (in the direction intersecting with the direction in which the pin member 114 extends). For instance, the damping pin may be formed into a shape of a damping pin 110g shown in FIG. 21B. The damping pin 110g shown in FIG. 21B is composed of an approximately rectangular parallelepiped pin member 114 whose section is rectangular, the damping member 112, and wall members 133a and 133b, i.e., an opposing portion, whose section is rectangular. The wall members 133a and 133b are provided so as to face with each other and so as to be distant in a direction intersecting with a direction in which the wall members 133a and 133b project. That is, the wall members 133a and 133b form a pair of planes facing with each other while being distant in the direction intersecting the direction in which the wall members project. These wall members 133a and 133b interpose the damping members 112 respectively with the pin member 114 and compressively hold the interposed damping members 112. It is noted that the wall members 133a and 133b may be formed by bending a part of the main frame 102 or may be provided by attaching separately prepared members to the main frame 102.

Returning to FIG. 19, if the driving motor 103 generates vibration in the drive unit 800 including the damping pin 110e, the drive frame 101 vibrates in the out-of-plane direction (in the direction of X in FIG. 19). Because the drive frame 101 is connected with the main frame 102, the vibration of the drive frame 101 is transmitted to the main frame 102. Thereby, the main frame 102 vibrates and then the projecting portion 131 vibrates. Still further, because the damping pin 110e is connected to the drive frame 101, the pin member 114 vibrates in conformity with the vibration. In such a case, the drive frame 101 and the main frame 102 hardly vibrate with same phase and amplitude, and the pin member 114 and the projecting portion 131 move while generating a phase difference. Therefore, the damping member 112 compressively held between the pin member 114 and the projecting portion 131 distorts in the shear direction (in the out-of-plane direction of the drive frame 101 or the axial direction of the pin member 114). Friction is generated within the damping member due to the distortion of the damping member 112 and the vibration energy vibrating the drive frame 101 is converted into thermal energy. Because the damping member 112 is in contact tightly with the both of the drive frame 101 and the projecting portion 131, the friction is liable to be generated by the distortion, and the vibration energy is efficiently converted into the thermal energy. As a result, the vibration of the drive frame 101 is reduced and the radiated sound caused by the vibration is also reduced.

The inventors conducted study tests on the reducing effect of the radiated sound caused by the vibration in the case when the drive unit 800 shown in FIG. 19 is used. In the experiment, the driving motor 103 of the drive unit 800 was driven by 2200 rpm to vibrate the drive frame 101 in the out-of-plane direction. Then, sound pressure levels Pa (dB) of radiated sounds were measured by a microphone not shown by using Test.Lab (not shown) manufactured by LMS Co. The microphone was installed at a position distant by 30 cm above the center part of the drive frame 101.

Figure 22:
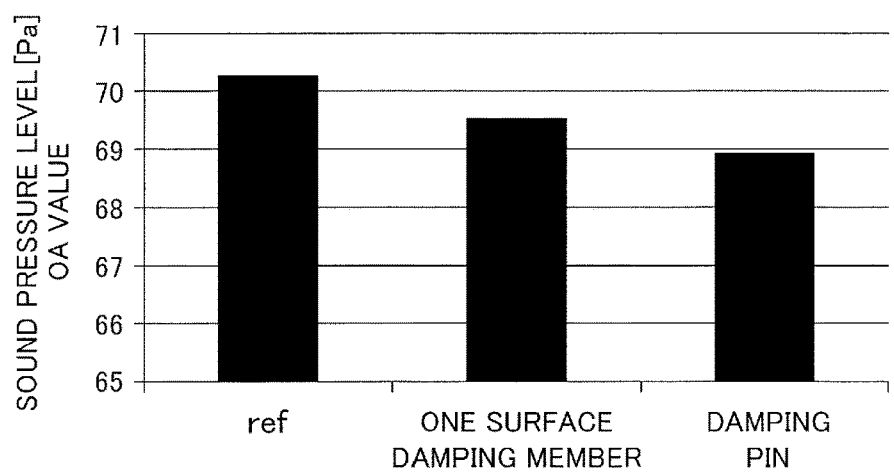
FIG. 22 is a graph indicating experimental results of the drive unit of the eighth embodiment and comparative examples.

FIG. 22 shows the experimental results of the drive unit 800 shown in FIG. 19. FIG. 22 is a graph indicating overall values of sound pressure levels of radiated sounds. In this experiment, the cases of only the frame (ref) without providing the damping pin 110 and when the damping member is pasted on one surface of the drive frame 101 (one surface damping member) were also measured for comparison.

As it is apparent from FIG. 22, the overall values of the sound pressure levels of the radiated sounds were 70.3 dB in the case of only the frame, 69.5 dB when the damping member was pasted, and 68.9 dB in the case of the drive unit 800. That is, the overall value of the sound pressure level of the radiated sound could be reduced in the case of the drive unit 800 as compared to the cases of only the frame and when the damping member was pasted. Thus, the high vibration reducing effect can be obtained by the drive unit 800 shown in FIG. 19 as compared to the case when the damping member was pasted on the one surface. In other words, the higher vibration reducing effect can be obtained by the drive unit 800 even though a small amount of damping member is used as compared to the conventional damper.

As described above, it is possible to obtain the same effect with the drive unit 100 shown in FIG. 3 and described above even by the drive unit 800 shown in FIG. 19. That is, because the vibration reducing effect higher than the conventional damper can be obtained by the damping structure whose structure is simple, which can be readily downsized, and which consumes only the small amount of damping member, the cost of the damping structure can be cut. Still further, it is possible to efficiently reduce vibration even if many components are disposed on the frame surface. Thus, it is possible to efficiently reduce the vibration and to considerably reduce the radiated sound caused by the vibration by providing the damping pin 110e as described above.

Ninth Embodiment

Figure 23A:
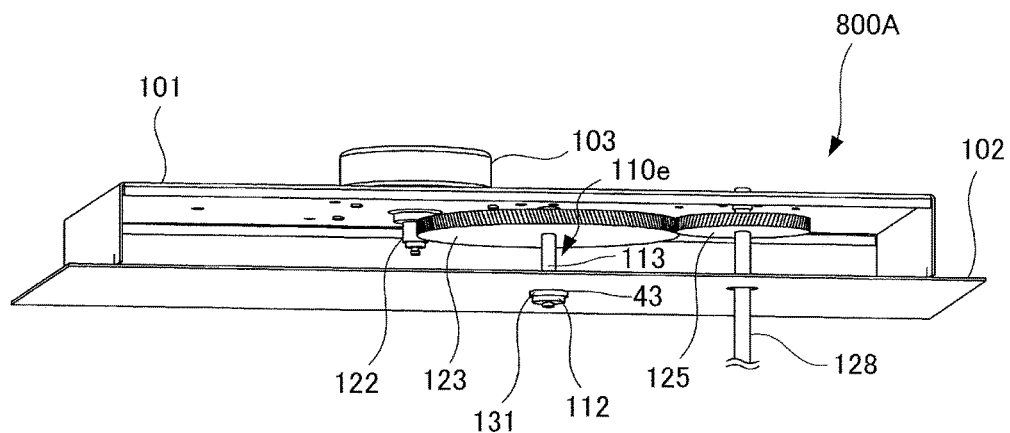
FIG. 23A is a perspective view schematically illustrating a drive unit of a ninth embodiment.
Figure 23B:
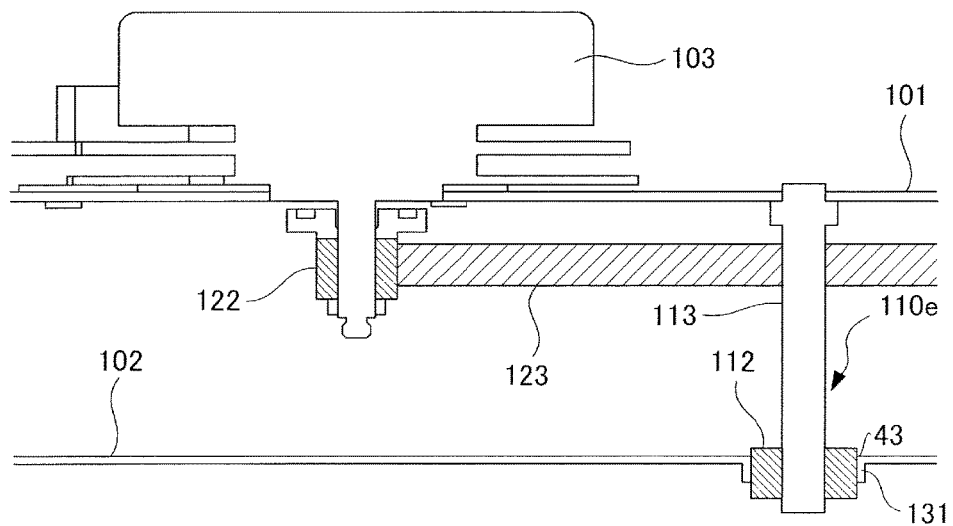
FIG. 23B is a section view of the drive unit shown in FIG. 23A.

A ninth embodiment of the present invention will be described with reference to FIGS. 23A and 23B. As already described above, it is effective to enhance the vibration reducing effect to suppress vibration of an idle gear shaft in a drive unit including a gear train in which a number of gears is combined. Then, it may be arranged to be able to use the idle gear shaft 113 instead of the pin member 114 without separately providing the damping pin 110e even in the case of the drive unit 800 shown in FIG. 19. FIGS. 23A and 23B illustrate such drive unit.

As shown in FIG. 23A, in the drive unit 800A, a through hole 43 and a projecting portion 131 are provided in the main frame 102 coaxially with the idle gear shaft 113 and the cylindrical damping member 112 is disposed within the projecting portion 131. Then, instead of the pin member 114, the idle gear shaft 113 is press-fitted into the damping member 112. In this case, the ringed damping member 112 is positioned so as to surround an outer circumference of the idle gear shaft 113 at a tip of the idle gear shaft 113 and the projecting portion 131 is positioned so as to surround an outer circumference of the damping member 112 as shown in FIG. 23B. The damping member 112 is compressively held between the projecting portion 131 and the idle gear shaft 113. This arrangement makes it possible to reduce vibration because the projecting portion 131 and the idle gear shaft 113 can move relatively by the vibration and the damping member 112 generates distortion by the relative move. That is, it is possible to effectively reduce the radiated sound caused by the idle gear shaft 113.

Tenth Embodiment

Figure 24A:
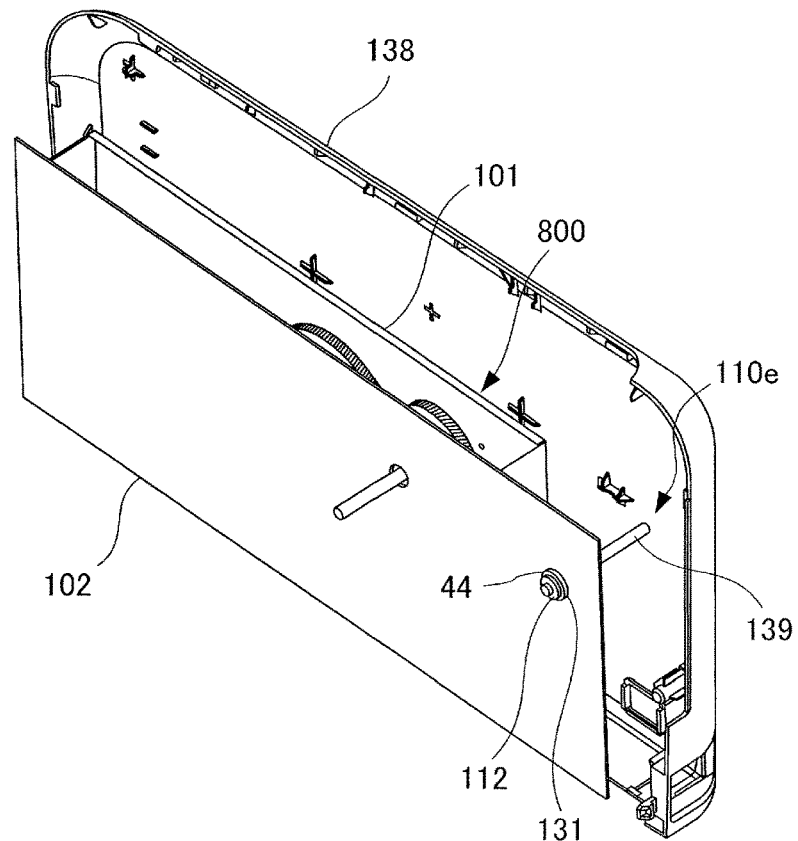
FIG. 24A is a perspective view schematically illustrating a drive unit of a tenth embodiment.

A tenth embodiment of the present invention will be described with reference to FIGS. 24A and 24B. If the drive unit 800 capable of removably attaching the process cartridge vibrates, there is a case when the vibration is transmitted to an outer sheath 138 covering the apparatus body through the main frame 102 as shown in FIG. 24A. Then, the outer sheath 138 vibrates and radiated sound is possibly generated from the outer sheath 138. Although the outer sheath 138 itself blocks sound generated from various units within the apparatus, there is a case when the sound propagates in air and vibrates the outer sheath 138 from the inside of the apparatus. Therefore, the radiated sound generated from the outer sheath 138 may increase by combining with the vibration transmitted to the outer sheath 138 through the main frame 102. Therefore, it is very effective to reduce the vibration of the outer sheath 138, in addition to the reduction of the vibration of the frame of the drive unit 800, in terms of the reduction of the radiated sound from an aspect of the entire image forming apparatus.

Figure 24B:
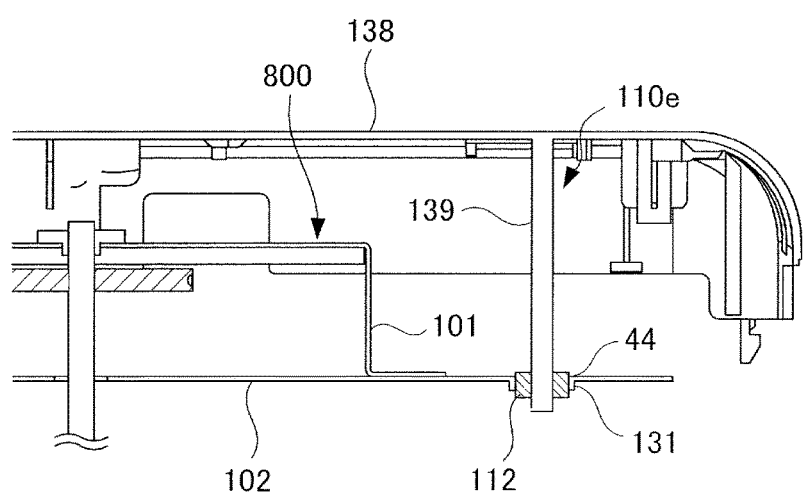
FIG. 24B is a section view of the drive unit shown in FIG. 24A.

As shown in FIGS. 24A and 24B, the outer sheath 138 is provided with a rib 139 formed integrally with the outer sheath 138 and projecting in an out-of-plane direction of the outer sheath 138 toward inside of the apparatus body. The main frame 102 is provided with the through hole 44 and the projecting portion 131, and the cylindrical damping member 112 is disposed within the projecting portion 131. One end part of the rib 139 is press-fitted into the damping member 112. Thus, the outer sheath 138 is connected with the main frame 102 of the drive unit 800 (see FIG. 19) through the rib 139. When the outer sheath 138 is connected with the main frame 102, the damping member 112 is held while being compressed in a shaft diameter direction of the rib 139 (in a direction intersecting with a direction in which the rib 139 projects) between the projecting portion 131 and the rib 139. The damping member 112 is the same with those described in the embodiments described above, an explanation thereof will be omitted here. Thus, when the projecting portion 131 and the rib 139 move relatively by vibration, the vibration is reduced because the damping member 112 generates distortion.

Eleventh Embodiment

While the damping pin 110 is provided so as to extend toward the pressure-contacted surfaces of the drive frame 101 and the main frame 102 in the embodiments described above such as the drive unit 100 shown in FIG. 3 and the drive unit 800 shown in FIG. 19, the present invention is not limited to such configuration. For instance, when the tip of the pin member 114 is connected with the main frame 102, the damping pin 110 may be provided such that the end face of the other end faces not the pressure-contacted surface of the drive frame 101 but a vertical face vertically erected with respect to the main frame 102. This will be described below.

Figure 25:
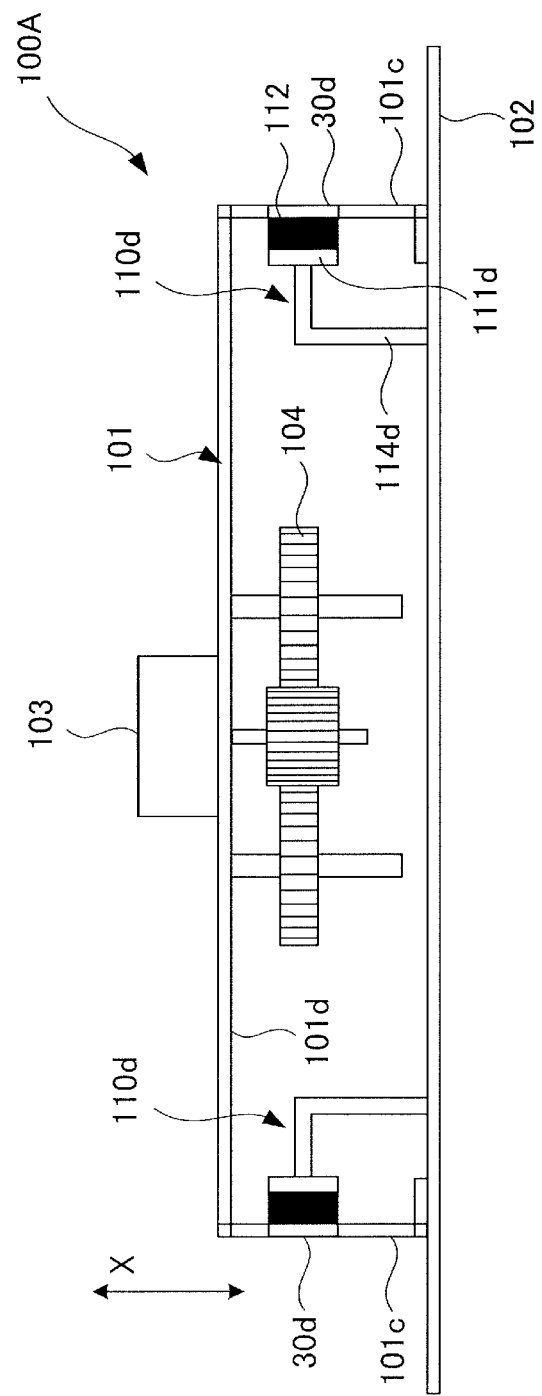
FIG. 25 is a section view schematically illustrating a drive unit of an eleventh embodiment.

FIG. 25 shows the drive unit 100A of an eleventh embodiment. In the drive unit 100A shown in FIG. 25, a pin member 114d that extends from the main frame 102 toward a pressure-contacted surface 30d of the drive frame 101 is bent from its middle so as to face a vertical surface 101c of the drive frame 101. The other end of the damping pin 110d is not connected with the vertical surface 101c and is configured to be able to hold the damping member 112 through a press member 111d. A pressure-contacted surface 30d, i.e., an opposing portion, is provided at a position facing the other end of the damping pin 110d on the vertical surface 101c of the drive frame 101. The damping pin 110d holds the damping member 112 by pressing the damping member 112 against the press-contacted surface 30d. That is, the damping member 112 is held while being compressed between the pin member 114d of the damping pin 110d and the press-contacted surface 30d.

When the driving motor 103 generates vibration in the drive unit 100A, the drive frame 101 and the main frame 102 vibrate in the out-of-plane direction (in the direction X in FIG. 25). The vibration of the drive frame 101 is hardly synchronized with the vibration of the pin member 114d and the press member 111d in terms of phase and amplitude, and the drive frame 101, the pin member 114d and the press member 111d move while generating a phase difference. Therefore, the damping member 112 compressively held between the drive frame 101 and the press member 111d generates distortion in the shear direction (in the direction intersecting with the direction in which the damping member is compressed). The damping member 112 generates friction due to the distortion, and the vibration energy vibrating the drive frame 101 is converted into thermal energy. Because the damping member 112 is in contact tightly with the both of the drive frame 101 and the press member 111d, the damping member 112 is liable to generate friction due to the distortion, and the vibration energy is efficiently converted into the thermal energy. As a result, the vibration of the drive frame 101 is reduced and the radiated sound caused by the vibration is reduced.

OTHER EMBODIMENTS

It is noted that each drive unit in the eighth to tenth embodiments described above is configured such that the damping member 112 is compressively held on the main frame 102 side, the present invention is not limited to such configuration and the damping member 112 may be compressively held on the drive frame 101 side. For instance, the projecting portion 131 may be formed on the drive frame 101, the damping member 112 may be disposed within the projecting portion 131, and the pin member 114 fixed to the main frame 102 may be press-fitted into the damping member 112.

Note that it is preferable to use a damping member (damping material) having a loss factor of 0.1 or more as the damping members 112 and 112b in order to obtain the vibration reducing effect more effectively. It is more preferable to use a damping member having the loss factor of 0.4 or more measured by a mechanical impedance method in a compressed state.

It is noted that the drive unit of each embodiment described above is not limited to be a drive unit driving the process cartridge including the image forming portion. For instance, it is applicable also to a developing drive unit driving a developing cartridge and to a drum drive unit driving a drum cartridge including a photosensitive drum, a charging roller, and an exposure unit.

It is noted that a case when the driving unit of each embodiment described above is applied to the image forming apparatus (see FIG. 1) in which toner images are directly transferred from the photosensitive drums 1Y through 1K to the transfer member S conveyed by the transfer member conveying belt 5 has been described, the present invention is not limited to such configuration. For instance, the driving unit described above is also applicable to an image forming apparatus including an intermediate transfer body, instead of the transfer member conveying belt 5, and configured to primarily transfer toner images of respective colors from the photosensitive drums 1Y through 1K to the intermediate transfer body and then to secondarily transfer composite toner images of the respective colors collectively to the transfer member S.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-057873, filed on Mar. 20, 2015, which is hereby incorporated by reference herein in its entirety.

What is claimed is:
1. A damping structure comprising:
a first frame including a first plate;
a driving motor provided on the first plate of the first frame;
a second frame provided at a position facing the first frame and including a second plate opposite to the first plate, the second frame being configured to support the first frame in such a manner that a gap is provided between the first and second plates;
a projecting portion provided in the gap and configured to project from one plate toward the other plate of the first and second plates;
a press member provided at a tip of the projecting portion and whose area is larger than an area of an end surface of the tip of the projecting portion; and
a damping member provided on the press member so as to be compressively held between the press member and the other plate, the damping member (i) having a rigidity lower than rigidities of the first frame, second frame, and the projecting portion and (ii) having a loss factor, measured by a mechanical impedance method in the state being compressed between the press member and the other plate, of 0.05 or more.

2. The damping structure according to claim 1, wherein the rigidity of the projecting portion is greater than the rigidity of at least one of the first frame and second frame.

3. The damping structure according to claim 1, wherein the projecting portion projects from the second plate toward the first plate, and
wherein the damping member is compressively held between the press member and a position of the first plate where a vibration amplitude of a surface of the first plate is greater than an average of vibration amplitudes of the surface of the first plate in a state in which no damping member is attached.

4. The damping structure according to claim 1, wherein the loss factor, measured by the mechanical impedance method in the state being compressed, of the damping member is 0.4 or more.

5. The damping structure according to claim 1, wherein hardness of the damping member is 70 degrees or less in terms of Asker C hardness.

6. The damping structure according to claim 1, wherein the damping member is compressed more than 0% and less than 50% from a thickness before compression.

7. The damping structure according to claim 1, wherein the projecting portion is a first projecting portion and the damping member is a first damping member, and
wherein the damping structure further comprises:
a third frame provided at a position facing the second frame in a state being connected with the second frame;
a second projecting portion projecting from one frame toward the other frame of the second and third frames; and
a second damping member compressively held between a tip of the second projecting portion and the other frame among the second and third frames, the second damping member (i) having a rigidity lower than rigidities of the second frame, third frame, and the second projecting portion and (ii) having a loss factor, measured by the mechanical impedance method in the state being compressed between the second projecting portion and the other frame among the second and third frames, of 0.05 or more.

8. The damping structure according to claim 7, wherein the rigidity of the second projecting portion is greater than the rigidity of at least one of the second and third frames.

9. The damping structure according to claim 7, wherein the driving motor is a first driving portion, and
wherein a second driving portion is mounted on the second frame such that the second driving portion is positioned between the second and third frames.

10. The damping structure according to claim 7, wherein the first projecting portion projects from the first frame toward a first opposing portion of the second frame, and
wherein the second projecting portion projects from the third frame toward a position facing the first opposing portion of the second frame.

11. The damping structure according to claim 9, wherein the second driving portion includes a rotator being configured to be rotationally driven, and
wherein the second projecting portion is a fixed shaft fixed to the second frame and supporting the rotator.

12. The damping structure according to claim 7, wherein the loss factor, measured by the mechanical impedance method in the state being compressed, of the second damping member is 0.4 or more.

13. The damping structure according to claim 7, wherein the second damping member has hardness of 70 degrees or less in terms of Asker C hardness.

14. The damping structure according to claim 7, wherein the second damping member is compressed more than 0% and less than 50% from a thickness before compression.

15. The damping structure according to claim 1, wherein the damping member is compressed between a component provided on the other plate and the press member.

16. The damping structure according to claim 1, the projecting portion is provided on the first plate.

* * * * *